(12) United States Patent
Dumont et al.

(10) Patent No.: US 10,935,564 B2
(45) Date of Patent: Mar. 2, 2021

(54) SYSTEMS AND METHODS FOR DETERMINING WIND VELOCITY

(71) Applicants: BNSF RAILWAY COMPANY, Fort Worth, TX (US); AIRFLOW SCIENCES CORPORATION, Livonia, MI (US)

(72) Inventors: Brian J. Dumont, Royal Oak, MI (US); James Paul, Carmel, CA (US); Matthew Fleming, Ypsilanti, MI (US); Paul Harris, Canton, MI (US); Corey D. Wills, Berryton, KS (US); Corey T. Pasta, Topeka, KS (US); Paul K. Gabler, Lenexa, KS (US); Dennis W. Morgart, Topeka, KS (US)

(73) Assignee: BNSF Railway Company, Fort Worth, TX (US)

( * ) Notice: Subject to any disclaimer, the term of this patent is extended or adjusted under 35 U.S.C. 154(b) by 152 days.

(21) Appl. No.: 16/295,094

(22) Filed: Mar. 7, 2019

(65) Prior Publication Data

US 2020/0284819 A1     Sep. 10, 2020

(51) Int. Cl.
    *G01P 5/24*      (2006.01)
    *B61K 13/00*     (2006.01)
    *G01P 5/06*      (2006.01)
    *G01P 13/04*     (2006.01)

(52) U.S. Cl.
CPC .............. *G01P 5/248* (2013.01); *B61K 13/00* (2013.01); *G01P 5/06* (2013.01); *G01P 13/045* (2013.01)

(58) Field of Classification Search
CPC .......... G01P 5/248; G01P 5/06; G01P 13/045; G01P 5/14; B61K 13/00; B61L 15/0081; B61L 3/006; B61L 15/0072; B61F 9/005
See application file for complete search history.

(56) References Cited

U.S. PATENT DOCUMENTS

| 4,987,542 A | 1/1991 | Tran |
| 5,117,687 A | 6/1992 | Gerardi |
| 5,357,795 A | 10/1994 | Djorup |
| 5,546,799 A | 8/1996 | Parker |

(Continued)

FOREIGN PATENT DOCUMENTS

| EP | 2048507 A2 | 4/2009 |
| EP | 3179254 A1 | 6/2017 |
| JP | 2012223076 A | 11/2012 |

OTHER PUBLICATIONS

Dumont, B. J. et al., "Pressure Sensing Probe," U.S. Appl. No. 16/295,240, filed Mar. 7, 2019, 64 pages.

(Continued)

*Primary Examiner* — David Z Huang

(57) ABSTRACT

In one embodiment, a system includes a vehicle, one or more probes coupled to the vehicle, and a controller. The vehicle is operable to traverse a distance. The one or more probes are operable to measure wind pressure and generate one or more wind pressure measurements. The controller is operable to receive the one or more wind pressure measurements from the one or more probes, determine a wind angle relative to the vehicle using the one or more wind pressure measurements, and determine a wind speed relative to the vehicle using the one or more wind pressure measurements and the wind angle.

20 Claims, 18 Drawing Sheets

(56) References Cited

U.S. PATENT DOCUMENTS

| | | | |
|---|---|---|---|
| 5,628,565 A | 5/1997 | Hagen et al. | |
| 7,281,891 B2 | 10/2007 | Smith et al. | |
| 7,363,808 B2 | 4/2008 | Ormel et al. | |
| 2007/0086893 A1 | 4/2007 | Pedersen | |
| 2017/0158347 A1* | 6/2017 | Anderson | G01P 13/025 |

OTHER PUBLICATIONS

Dumont, B. J. et al., "Systems and Methods for Converting Wind Pressure to Wind Velocity," U.S. Appl. No. 16/295,371, filed Mar. 7, 2019, 64 pages.

Dumont, B. J. et al., "Systems and Methods for Communicating Information Associated with Wind Pressures," U.S. Appl. No. 16/295,490, filed Mar. 7, 2019, 65 pages.

Dumont, B. J. et al., "Systems and Methods for Measuring Wind Velocity for Vehicles Traversing Curve," U.S. Appl. No. 16/295,604, filed Mar. 7, 2019, 64 pages.

Patent Cooperation Treaty, International Search Report and Written Opinion, International Application No. PCT/US2020/015361, dated May 4, 2020, 10 pages.

* cited by examiner

SYSTEMS AND METHODS FOR DETERMINING WIND VELOCITY

TECHNICAL FIELD

This disclosure generally relates to determining wind velocity, and more specifically to systems and methods for determining wind velocity relative to a vehicle.

BACKGROUND

Under certain conditions, vehicles are susceptible to wind-induced tip-over. For example, surface pressures that occur during high wind conditions can result in forces and moments that may cause a train to derail. Currently, real-time wind speed and direction data is insufficient to make safety decisions regarding vehicle operations in potentially high and/or unknown wind conditions.

SUMMARY

According to an embodiment, a system includes a vehicle, one or more probes coupled to the vehicle, and a controller. The vehicle is operable to traverse a distance. The one or more probes are operable to measure wind pressure and generate one or more wind pressure measurements. The controller is operable to receive the one or more wind pressure measurements from the one or more probes, determine a wind angle relative to the vehicle using the one or more wind pressure measurements, and determine a wind speed relative to the vehicle using the one or more wind pressure measurements and the wind angle.

According to another embodiment, a method includes receiving, by a controller, one or more wind pressure measurements from one or more probes. The one or more probes are coupled to a vehicle and the vehicle is operable to traverse a distance. The method also includes determining, by the controller, a wind angle relative to the vehicle using the one or more wind pressure measurements. The method further includes determining, by the controller, a wind speed relative to the vehicle using the one or more wind pressure measurements and the wind angle.

According to yet another embodiment, one or more computer-readable storage media embody instructions that, when executed by a processor, cause the processor to perform operations including receiving one or more wind pressure measurements from one or more probes. The one or more probes are coupled to a vehicle and the vehicle is operable to traverse a distance. The operations also include determining a wind angle relative to the vehicle using the one or more wind pressure measurements. The operations further include determining a wind speed relative to the vehicle using the one or more wind pressure measurements and the wind angle.

Technical advantages of certain embodiments of this disclosure may include one or more of the following. The systems and methods described herein may improve safety based on rapid identification of wind conditions that may result in vehicle (e.g., train) blow-overs. Certain embodiments measure wind velocity relative to a vehicle using probes mounted to the vehicle. These wind velocity measurements may be used to determine whether wind-induced tip-over is imminent.

Certain embodiments described herein generate wind speed and wind direction data that may be communicated to vehicle operators, which enables the vehicle operators to take remedial actions such as slowing or stopping vehicles encountering dangerous wind conditions. For example, a train operator may slow down a train if the wind direction and wind speed data indicate that wind-induced tip-over is imminent or likely. The systems and methods described herein may provide a competitive advantage by more accurately identifying local wind states, which may allow vehicles that are not expected to encounter unsafe conditions to continue operations without being subjected to speed restrictions. Allowing vehicles to continue operations without being subjected to speed restrictions may provide a monetary advantage since speed restrictions can result in costly delays for transportation systems.

Certain embodiments of this disclosure utilize probes mounted to a locomotive of a train to measure wind velocity while the train is in motion. The probes may be located to fit within certain Association of American Railroads (AAR) locomotive shape and size clearances, which provides a safe and efficient wind measurement system. In certain embodiments, the probes do not have moving parts independent of the train, which increases reliability in measuring wind velocity. The systems and methods described herein may be ruggedized (e.g., hard wired) for industrial field use. Unlike many existing devices which are only accurate for headwinds, the systems and methods described herein measure both headwinds and crosswinds accurately.

The systems and methods described herein may provide real-time accurate local ambient wind speed and direction data for trains, which may reduce the number of unnecessary train stops and/or reduction of train speed caused by current less accurate high wind forecasts. The systems and methods described herein are adaptable to other modes of transportation. For example, the systems and methods described herein may be adaptable to road trucks to provide real-time in-motion wind speed and direction data to a driver and/or to a centralized database. As another example, the systems and methods described herein may be adaptable to an aircraft for enhanced measurement of headwind and crosswind during flight. As still another example, the systems and methods described herein may be adaptable to wind turbine nacelles for enhanced measurement of wind speed and direction, which may improve control and efficiency of power generation.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which:

FIG. 9A illustrates a CFD model domain used to investigate the system of FIG. 1;

FIG. 9B illustrates a train used in the CFD model domain of FIG. 9A;

FIG. 9C illustrates a plan view of a simulated airflow around the train of FIG. 9B;

FIG. 9D illustrates a front view of a simulated airflow around the train of FIG. 9B;

FIG. 9E illustrates a perspective view of a simulated airflow around the train of FIG. 9B;

FIG. 9F illustrates a top view of a simulated airflow around a probe of FIG. 9E;

DETAILED DESCRIPTION

Known methods for measuring ambient wind speed and direction near a moving vehicle utilize lengthy booms or other support structures to move wind sensors outside of the vehicle's influence and/or disturbed air flow. These methods may be impractical for general service since the wind sensors are located outside the normal vehicular clearance envelope or are located on booms that fit within the clearance envelopes and are used for short-term tests but are impractical for normal train operations. Ground-based anemometers may be located too far apart or too far away from the moving vehicle to provide actionable, real-time wind speed and direction data. The systems and methods described herein account for these deficiencies by measuring the ambient wind speed and direction from the moving vehicle.

The systems and methods described herein use probes attached to a vehicle to measure wind speed and direction relative to the vehicle. In certain embodiments, a controller uses wind pressures received from the probes and algorithms to calculate ambient wind speed and direction data while correcting the data for errors due to the probe locations potentially being within disturbed airflow around the vehicle. The probes are five-sided probes with pressure ports on three or four of the five sides and a reference port at an end of the probe. Differential pressures are measured between the ports, and a calibration procedure is used to convert the differential pressure readings into wind speed and direction relative to the vehicle.

Figure 1:
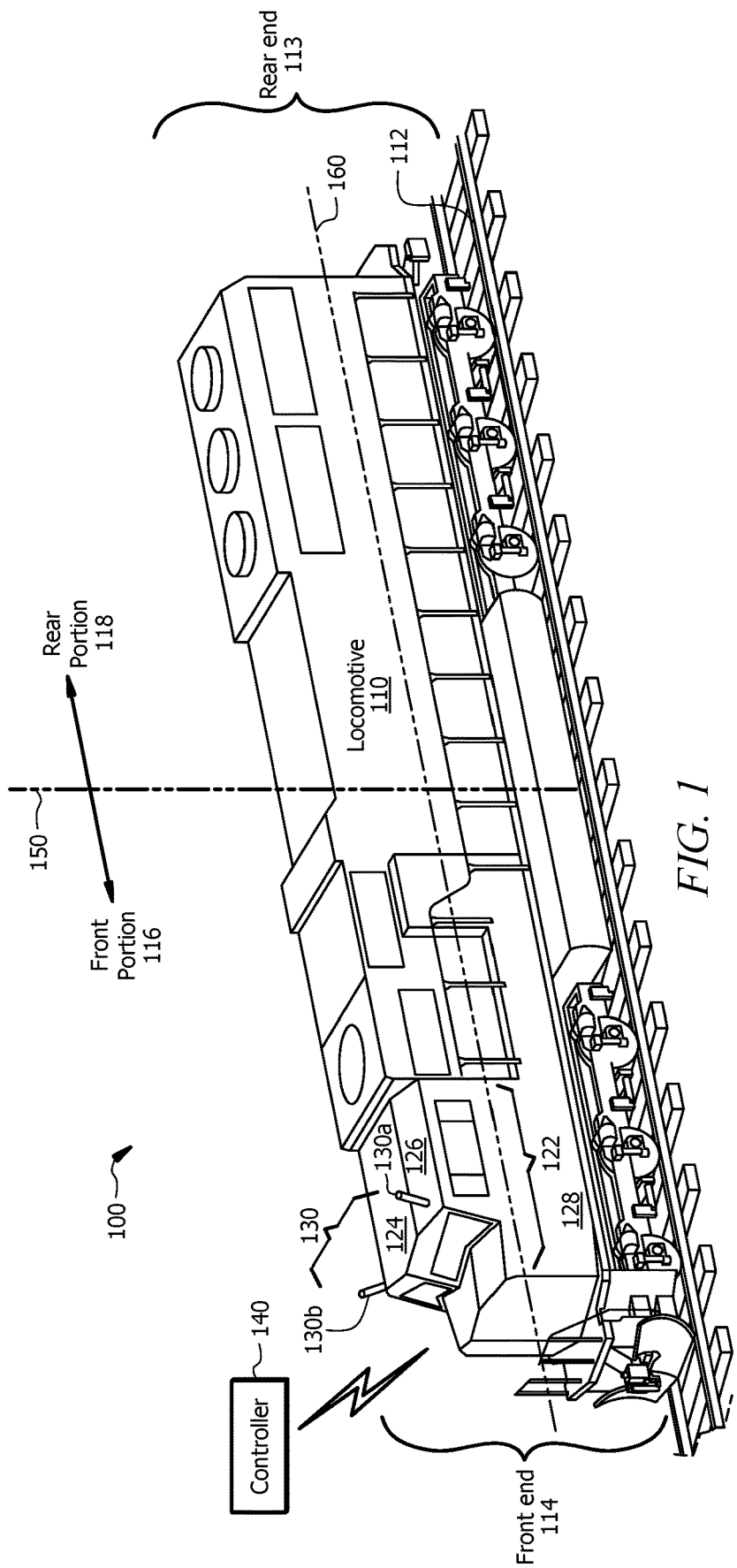
FIG. 1 illustrates an example system for determining wind velocity relative to a vehicle.
Figure 2:
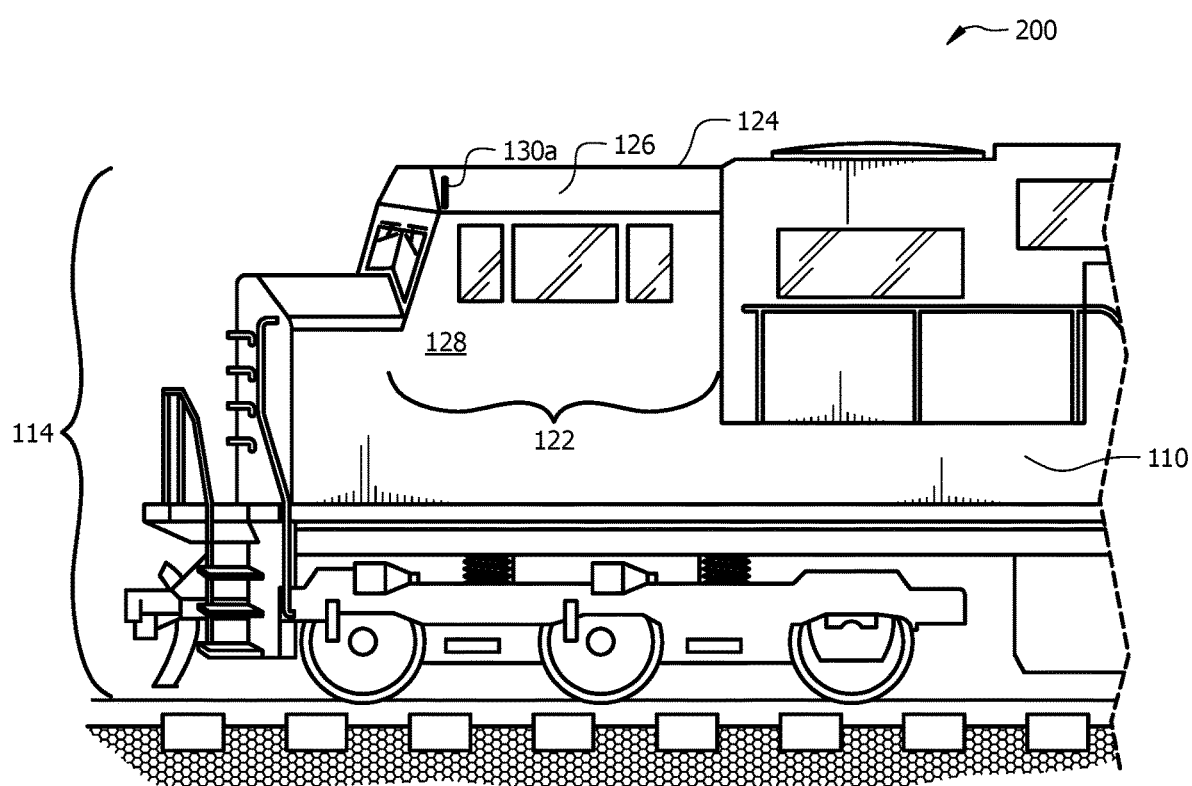
FIG. 2 illustrates a side view of the vehicle of FIG. 1.
Figure 3:
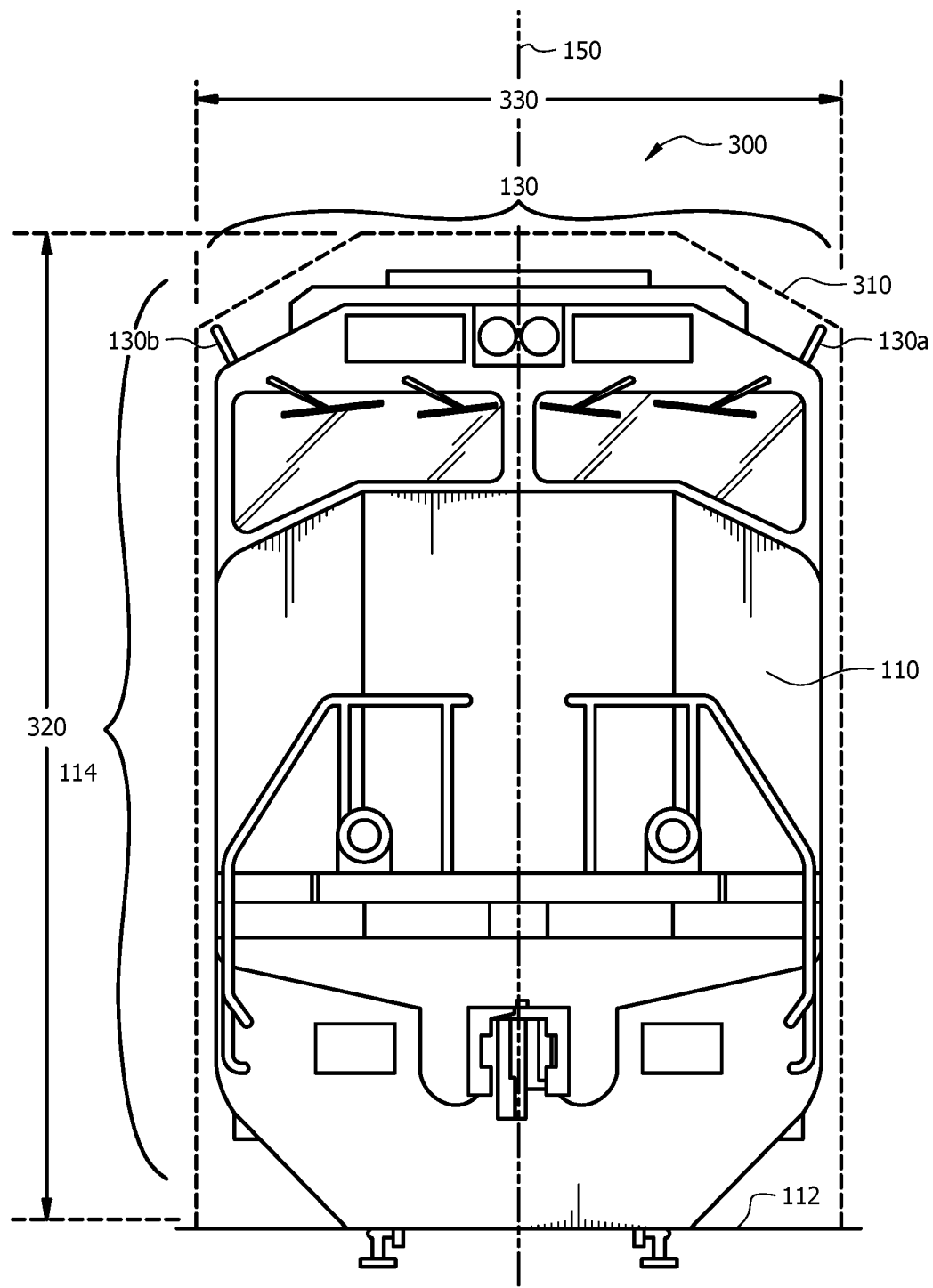
FIG. 3 illustrates a front view of the vehicle of FIG. 1.
Figure 4:
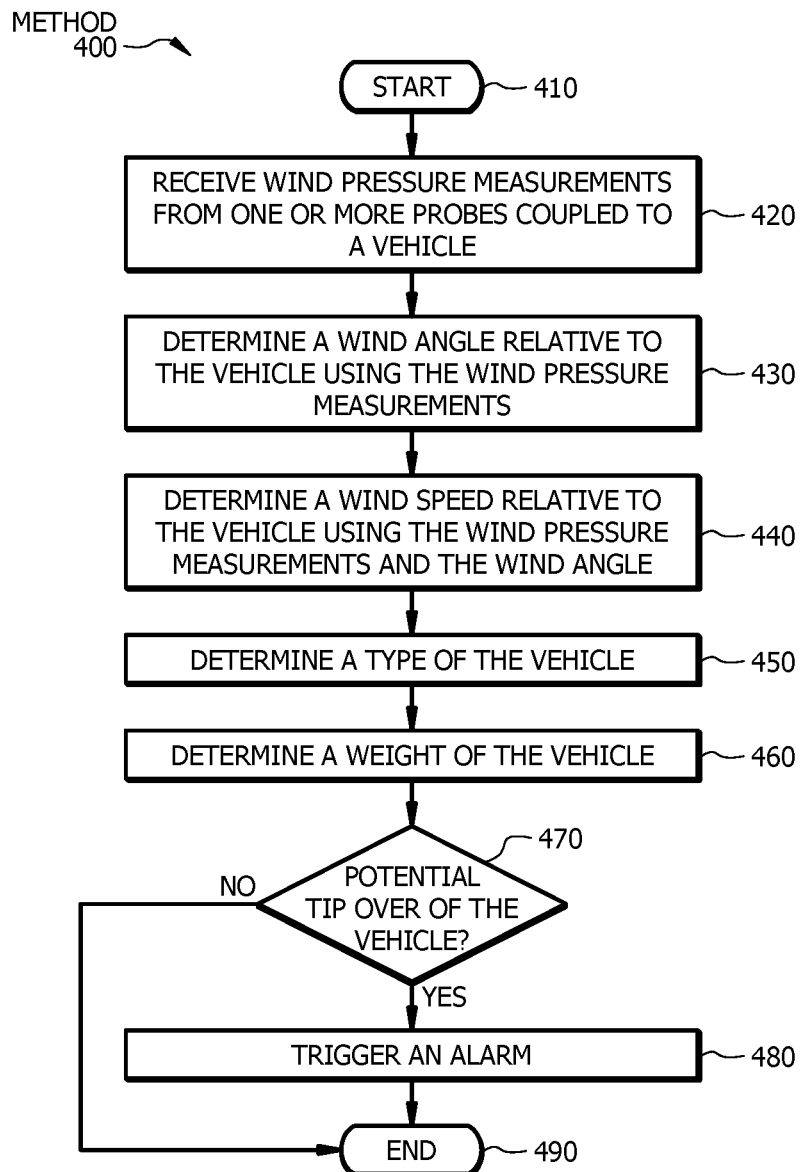
FIG. 4 illustrates an example method for determining wind velocity relative to a vehicle.
Figure 5:
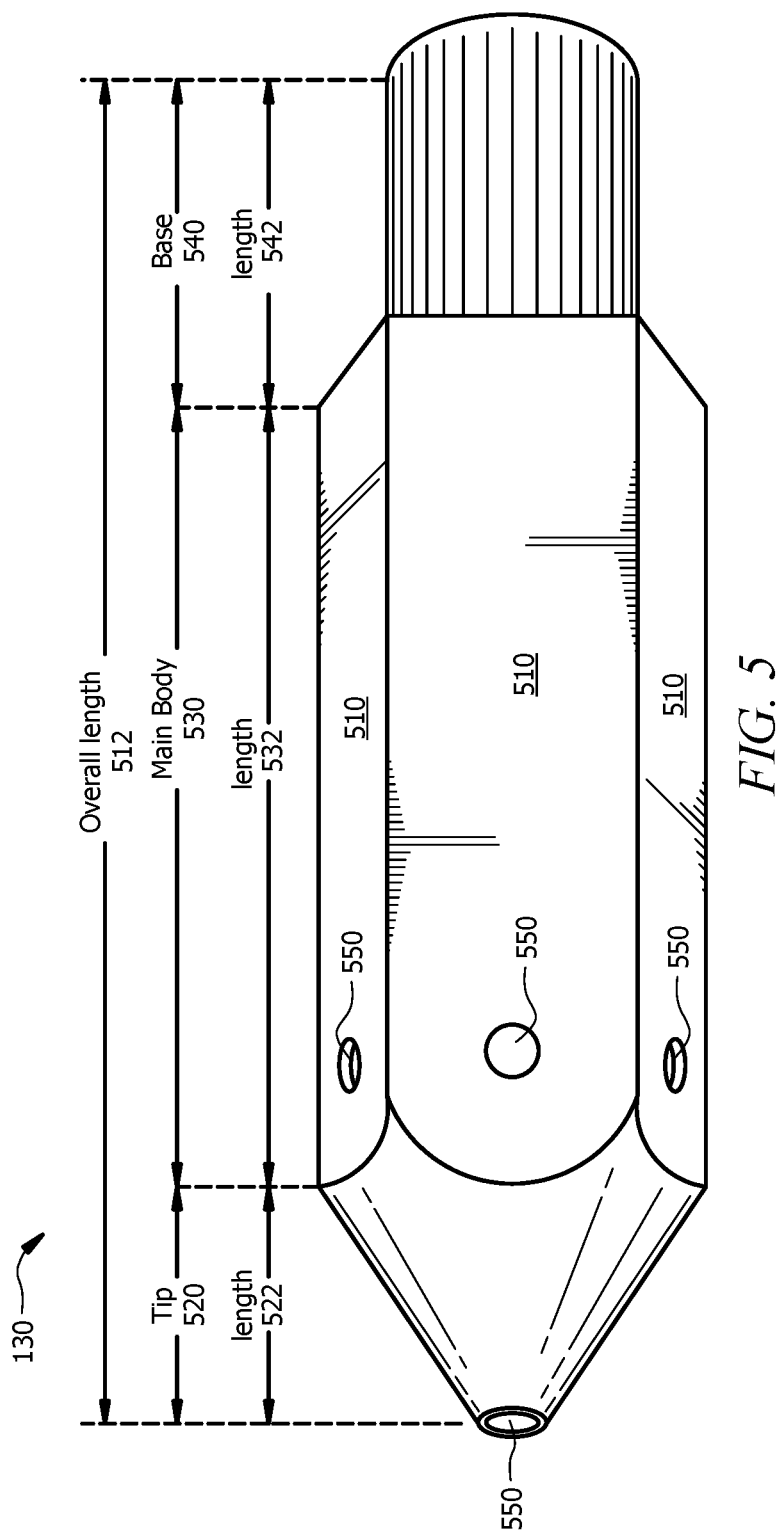
FIG. 5 illustrates an example probe that may be used by the system of FIG. 1.
Figure 6:
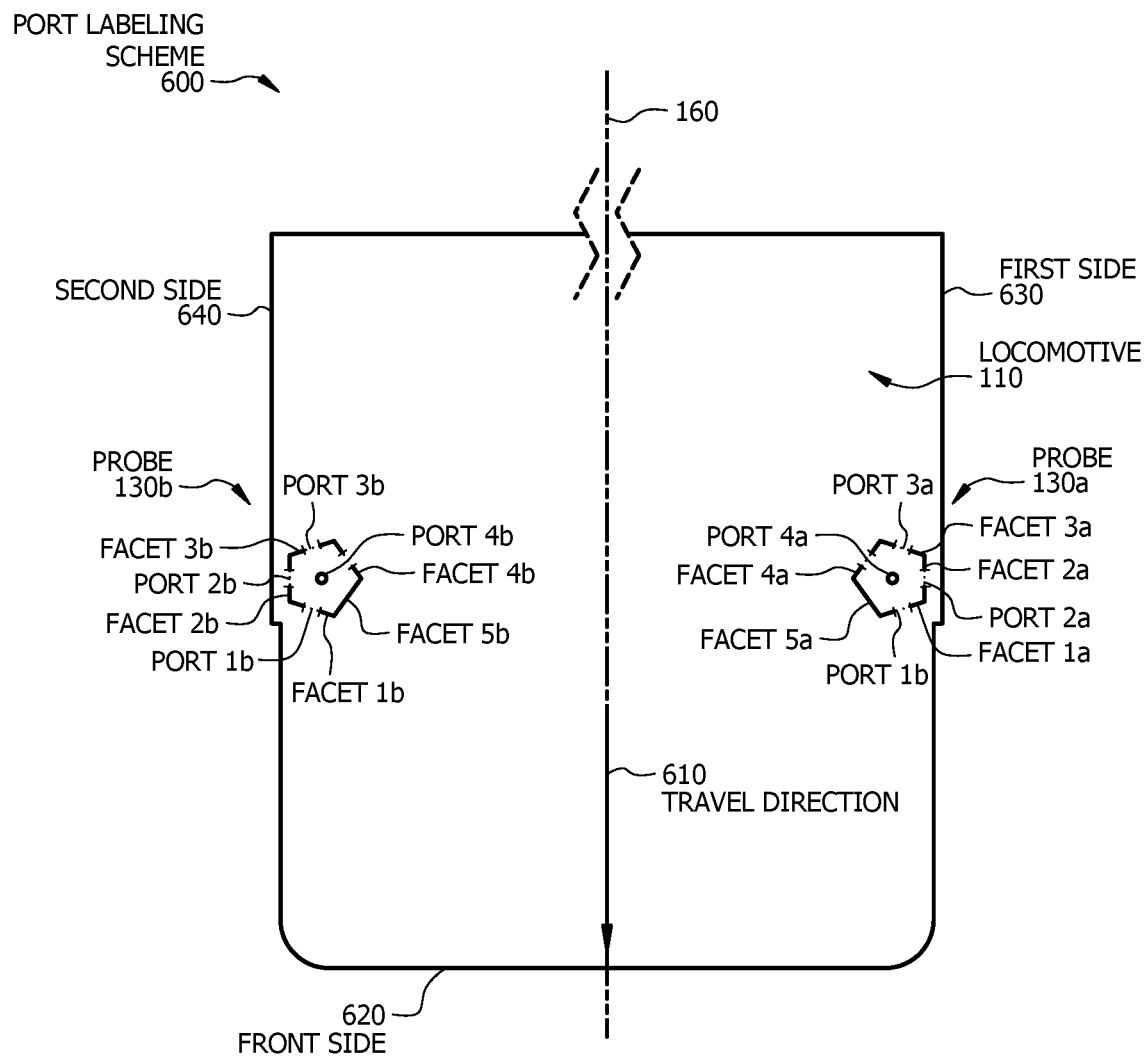
FIG. 6 illustrates an example port labeling scheme for the probe of FIG. 5.
Figure 7A:
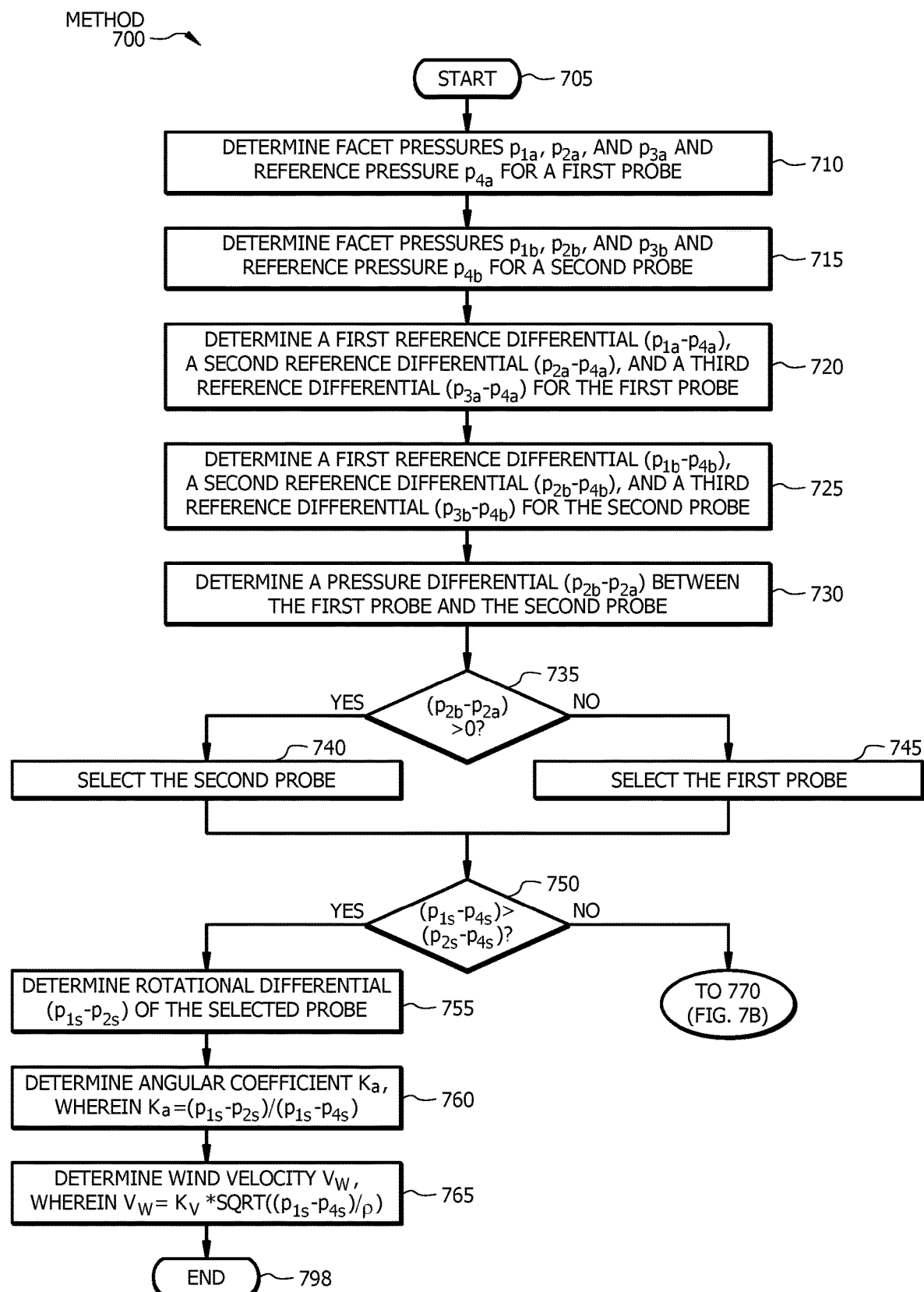
FIGS. 7A and 7B illustrate an example method for determining wind velocity in accordance with the port labeling scheme of FIG. 6.
Figure 7B:
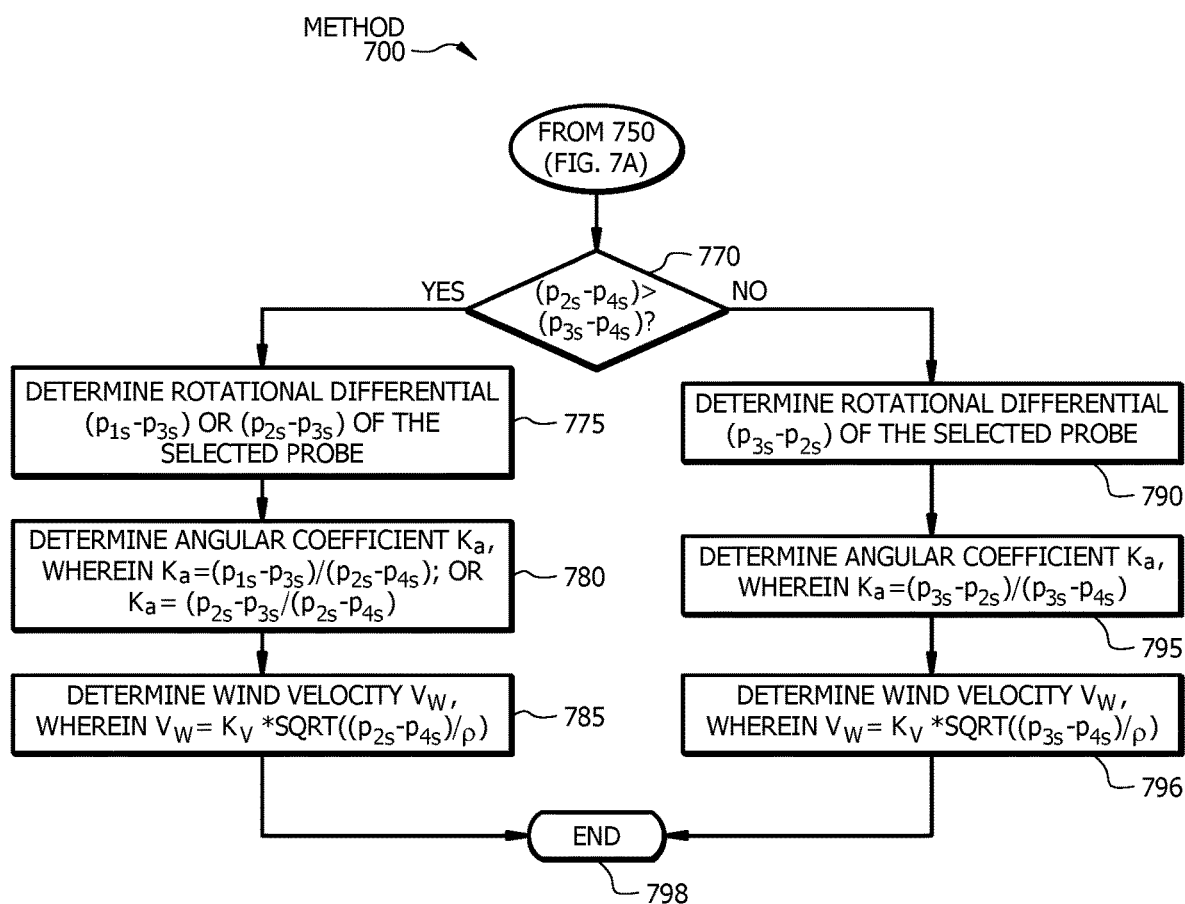
Figure 8:
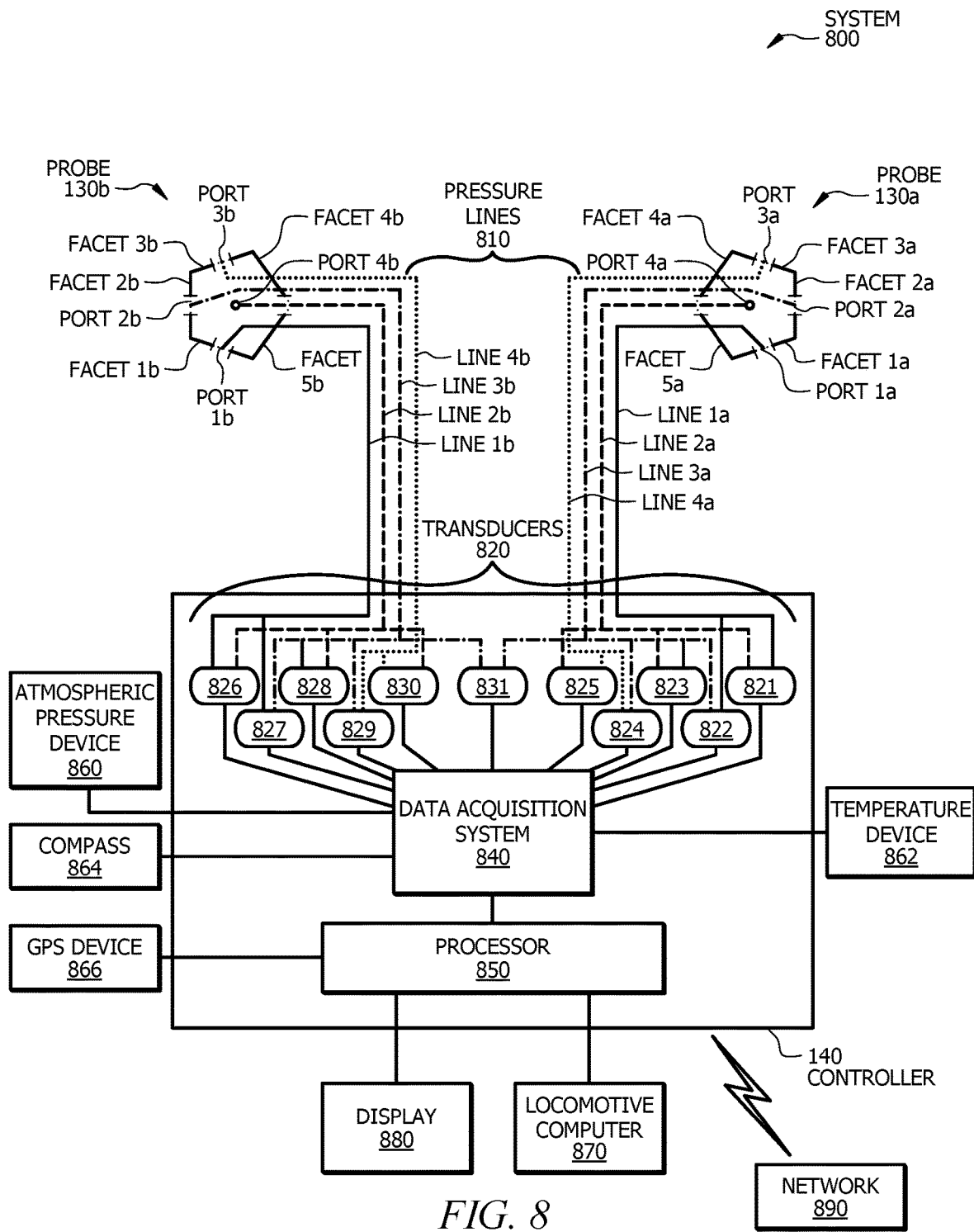
FIG. 8 illustrates an example communication system that may be used by the system of FIG. 1.
Figure 9A:
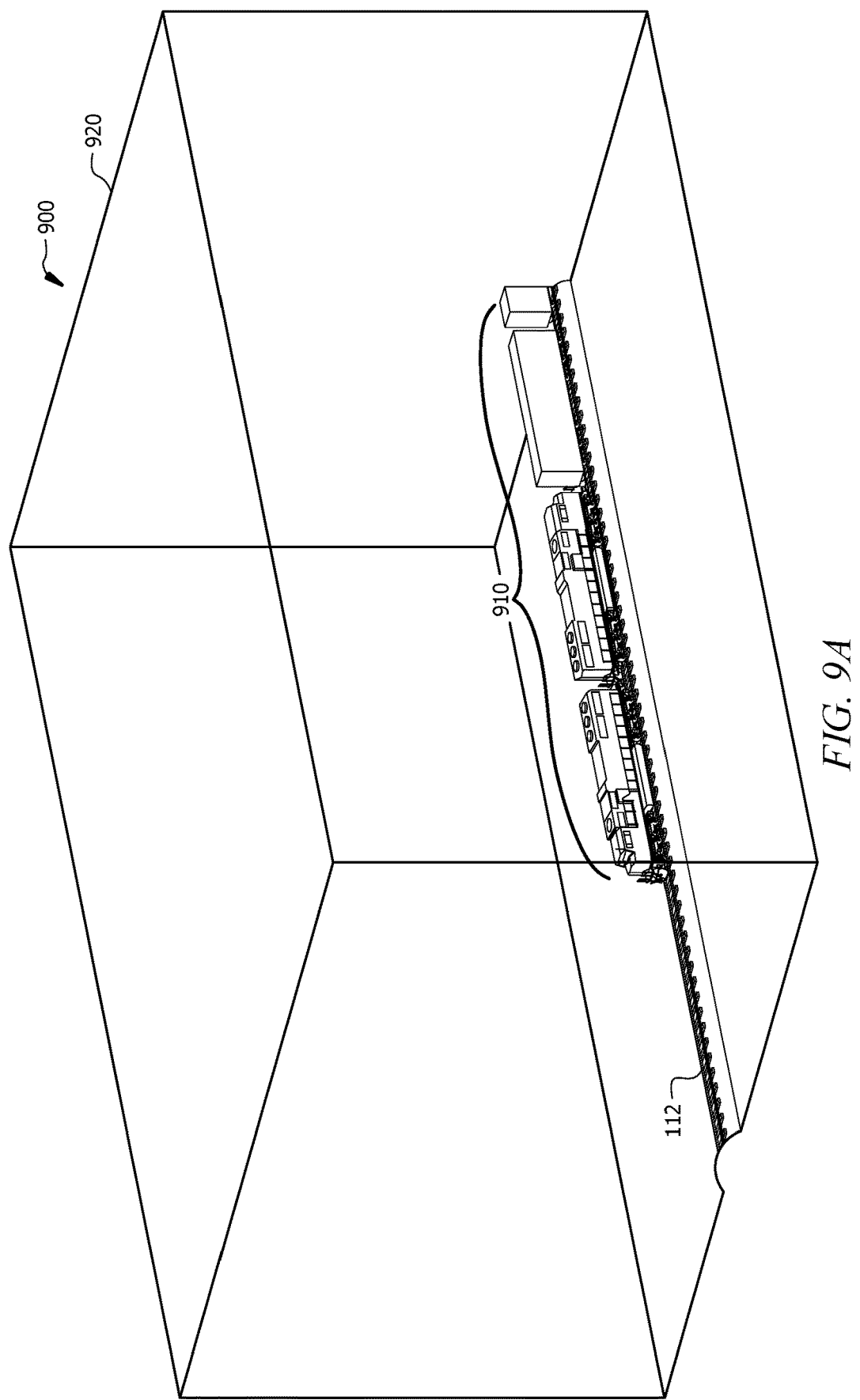
FIGS. 9A-9F illustrate computational fluid dynamics (CFD) simulations used to investigate the system of FIG. 1.
Figure 9B:
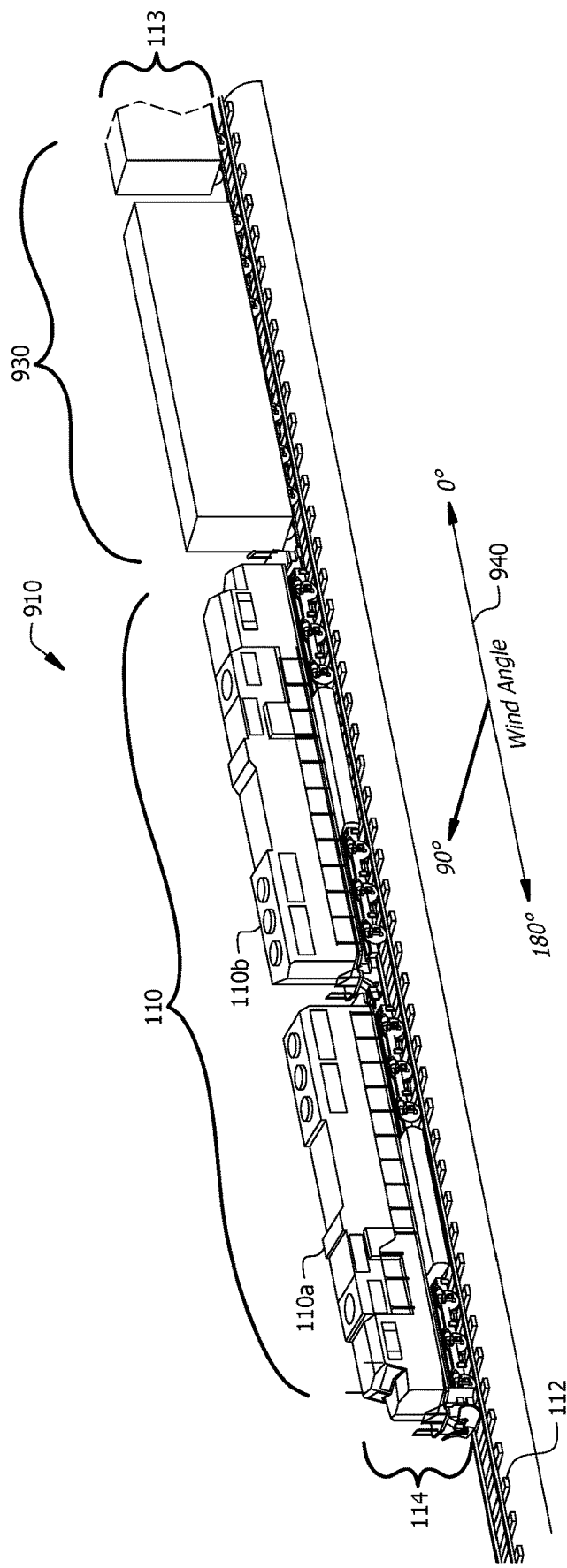
Figure 9C:
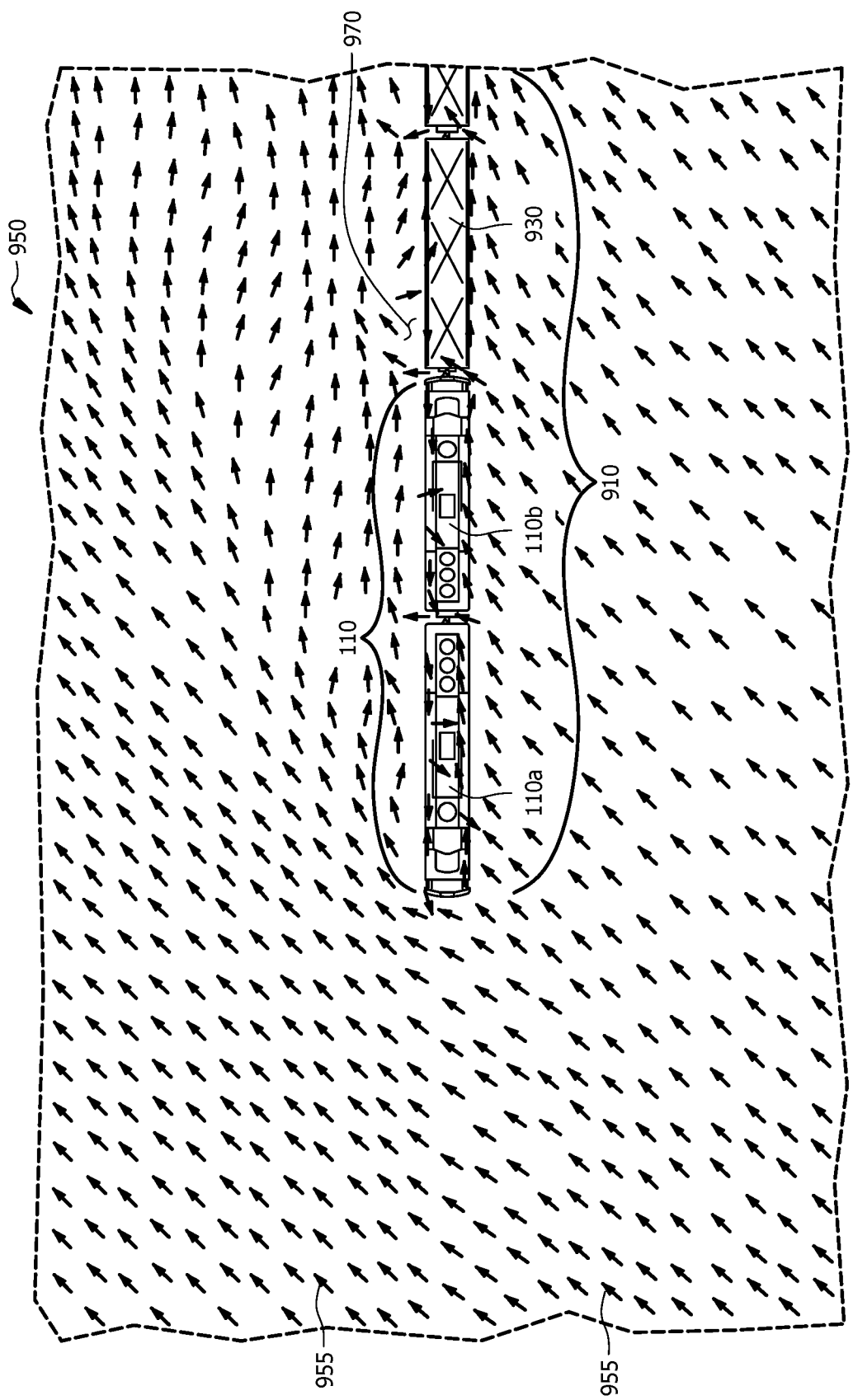
Figure 9D:
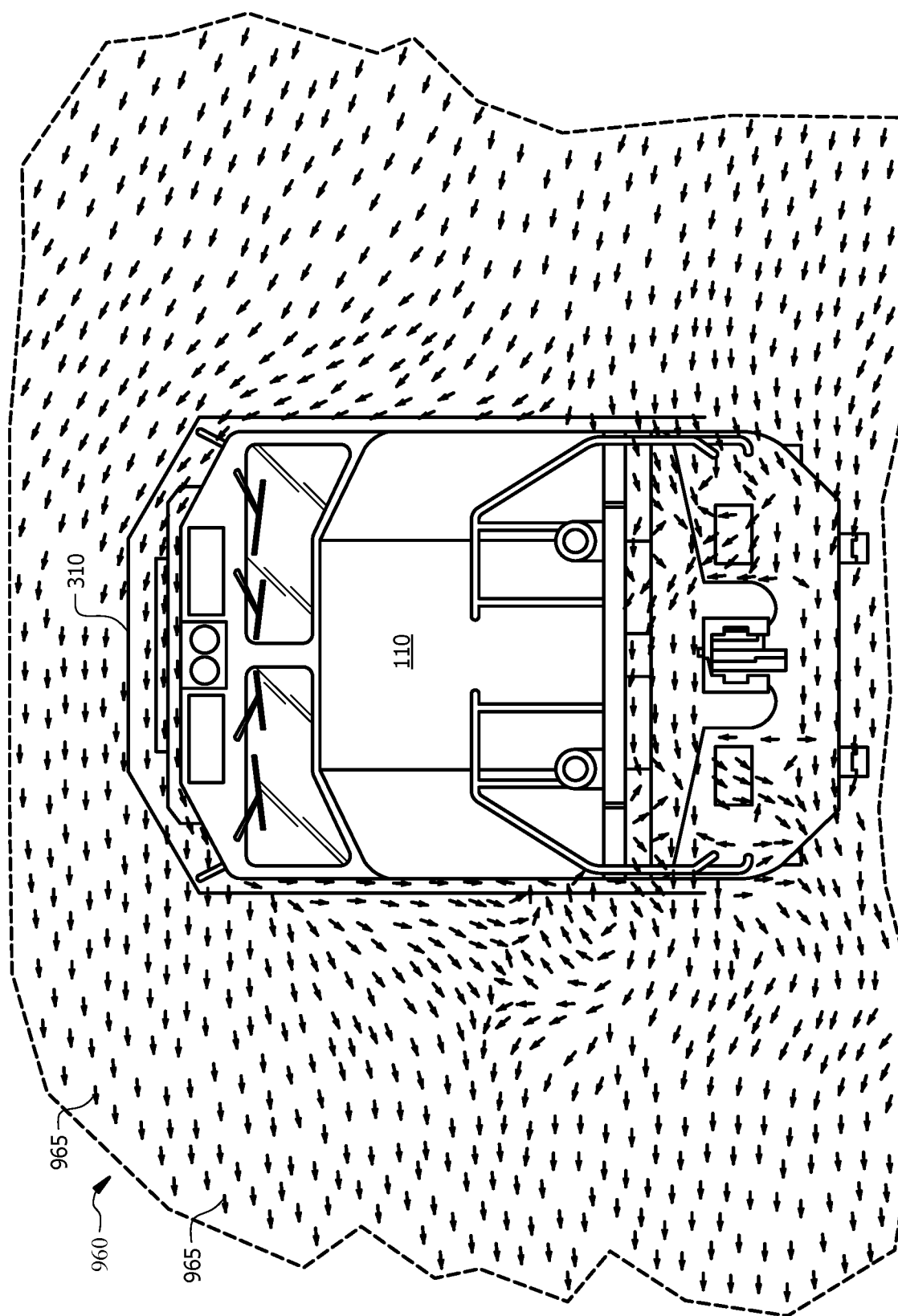
Figure 9E:
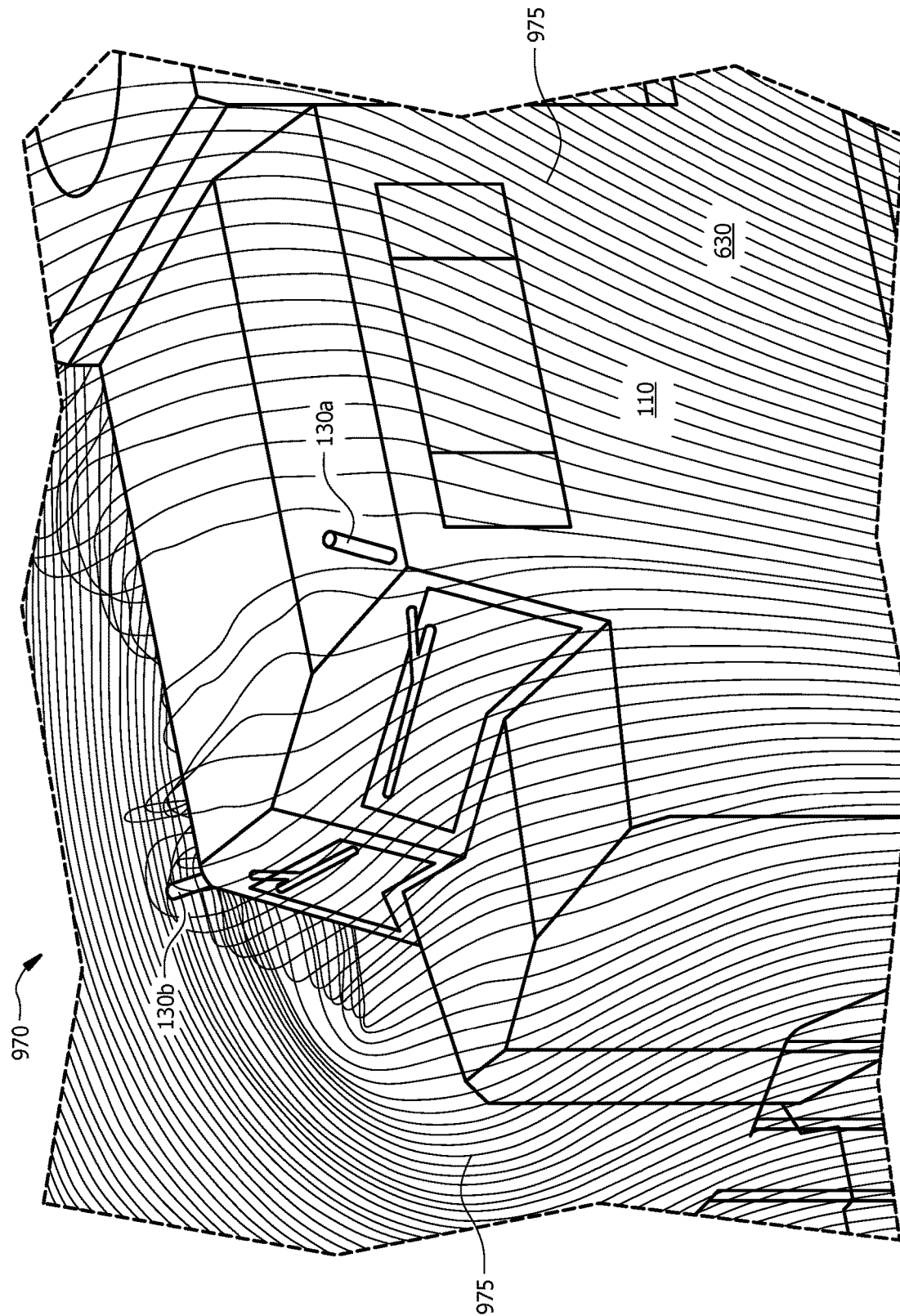
Figure 9F:
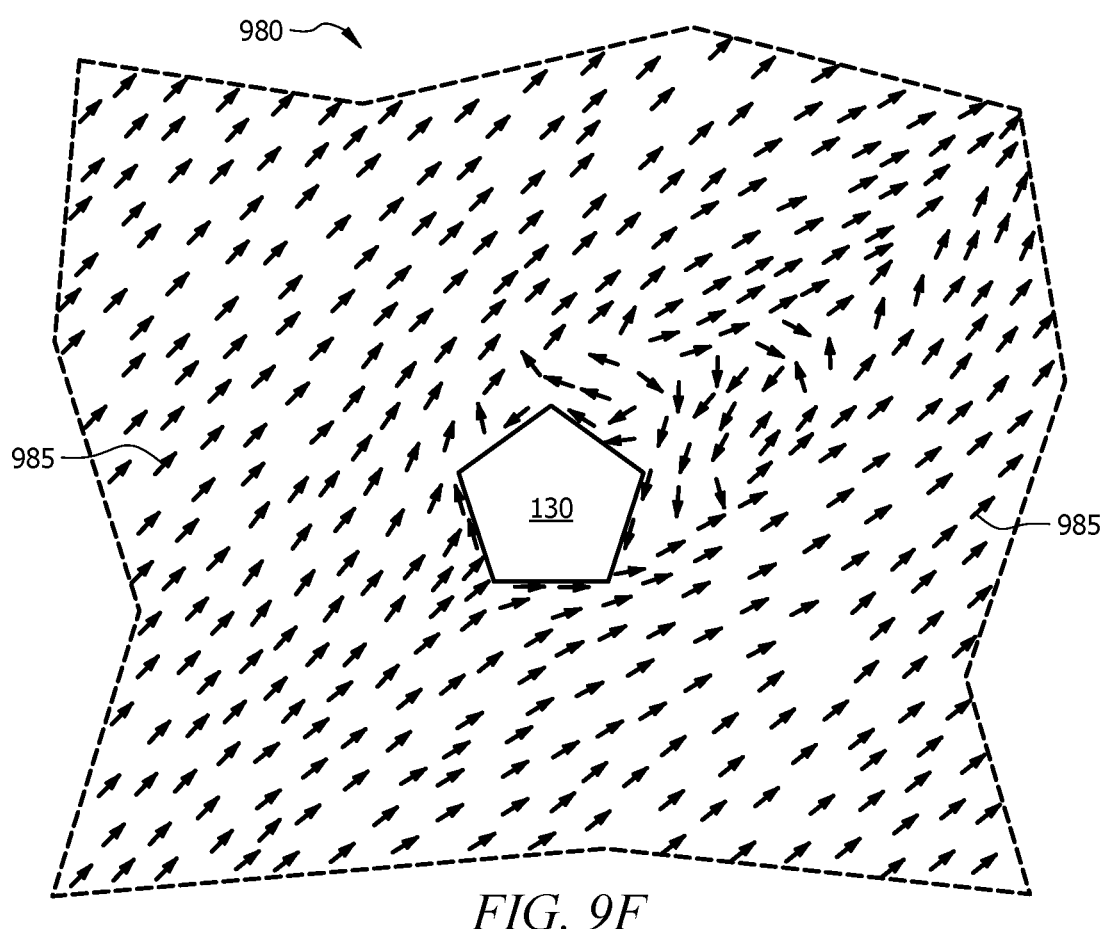
Figure 10:
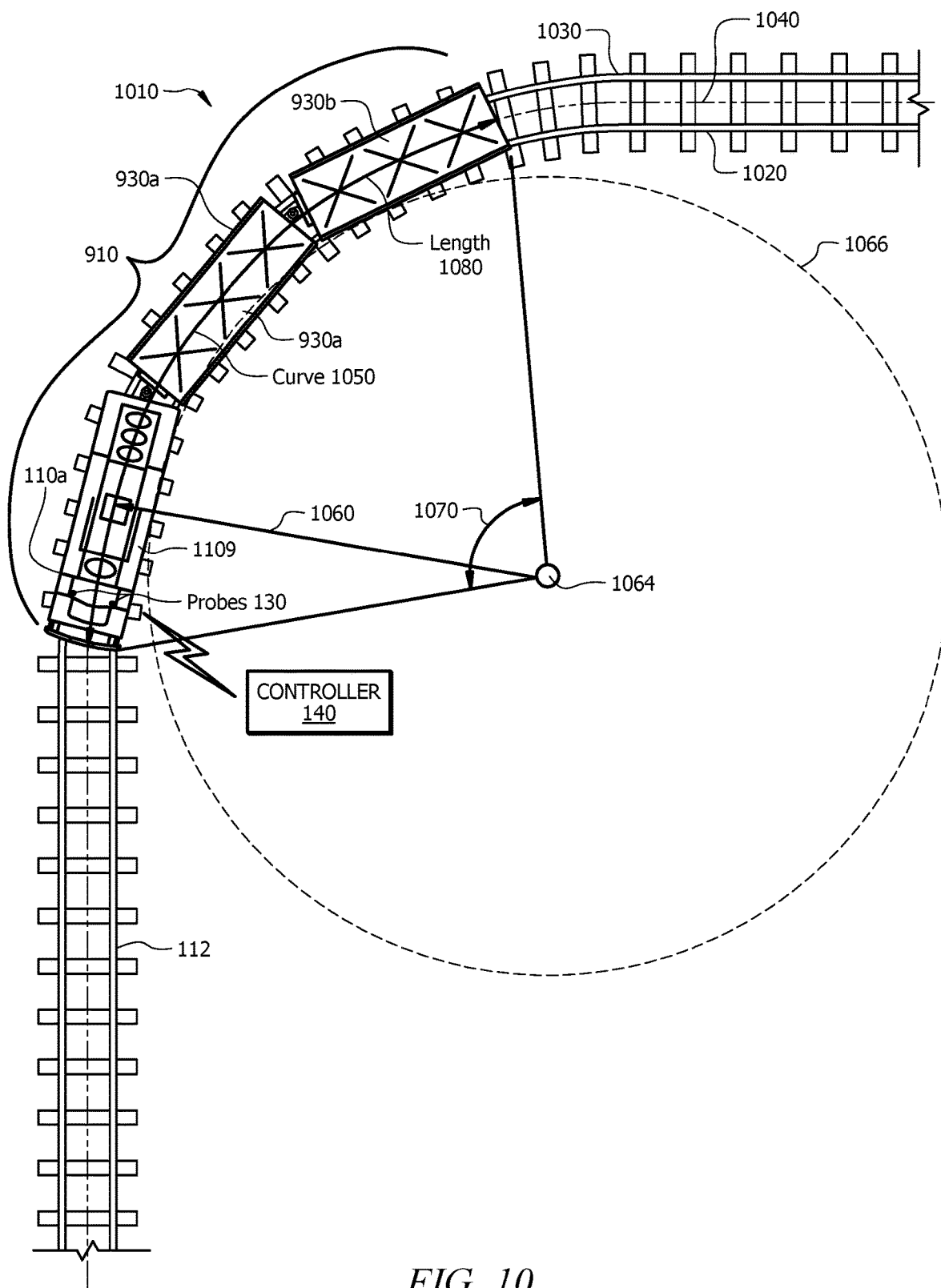
FIG. 10 illustrates an example system for determining wind velocity relative to each railroad car of a train traversing a curve of a track.
Figure 11:
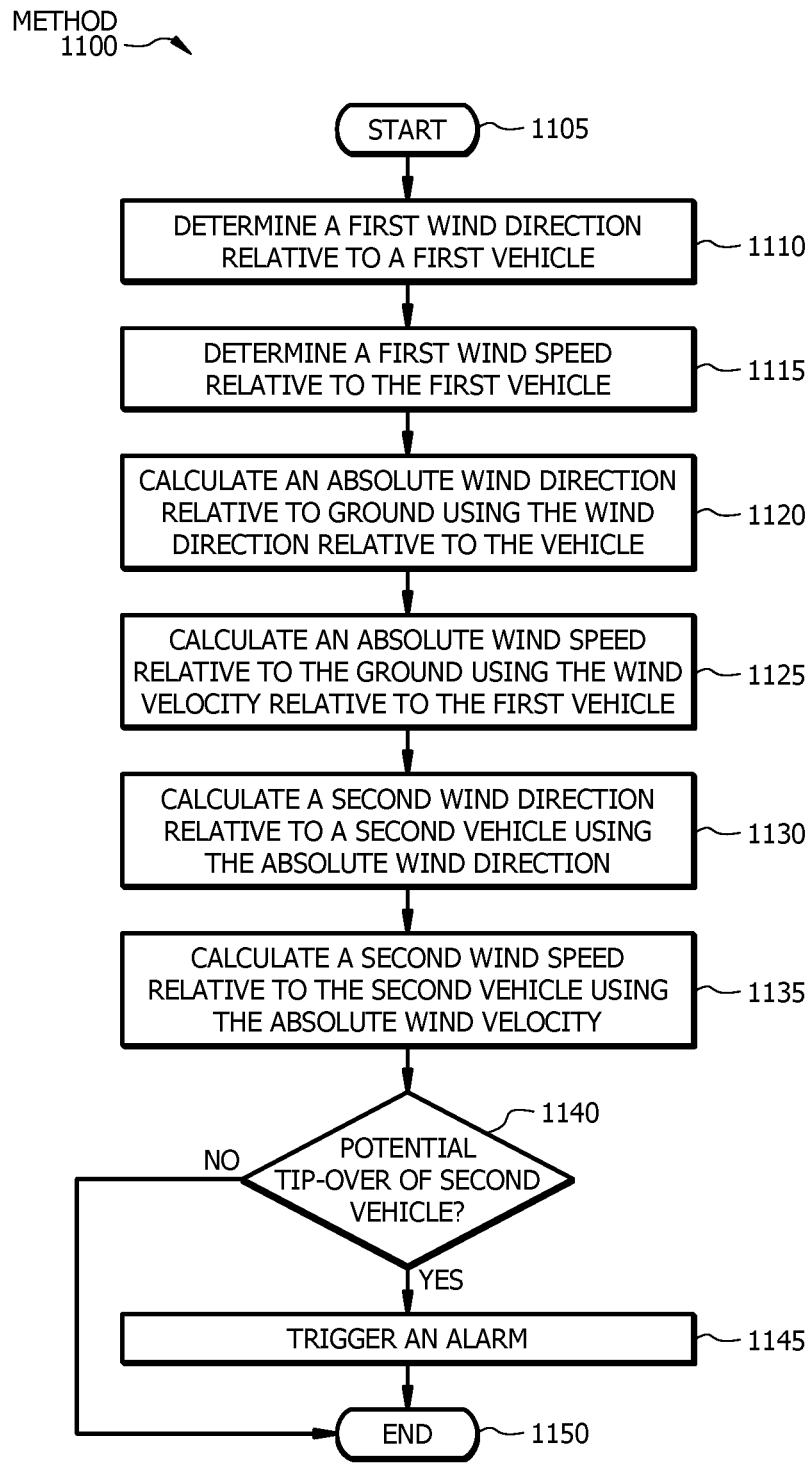
FIG. 11 illustrates an example method for determining wind velocity relative to a railroad car of a train traversing a curve of a track.
Figure 12:
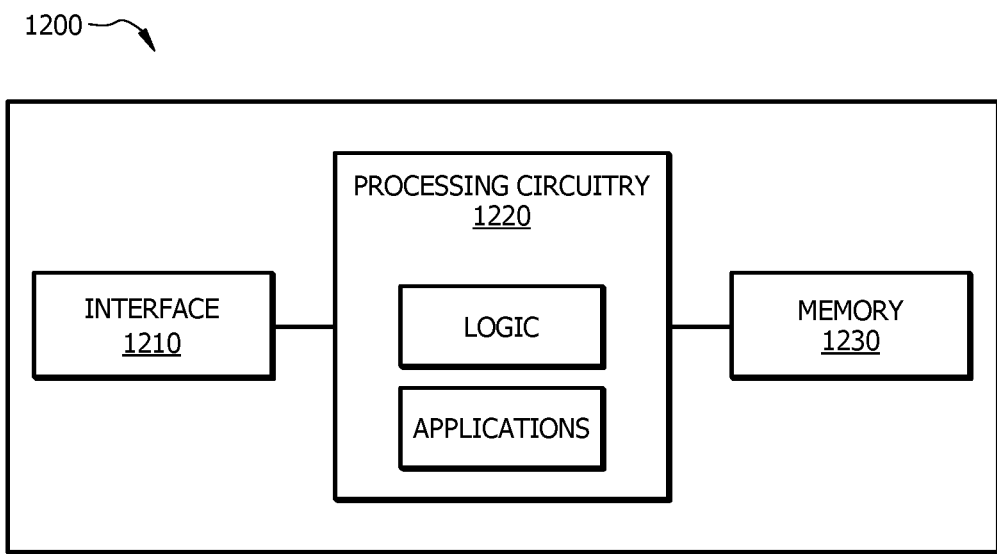
FIG. 12 illustrates an example computer system that may be used by the systems and methods described herein.

FIGS. 1 through 12 show example systems and methods for determining wind velocity relative to a vehicle. FIG. 1 shows an example system for determining wind velocity relative to a vehicle, and FIGS. 2 and 3 show a side view and a front view, respectively, of the vehicle used in FIG. 1. FIG. 4 shows an example method for determining wind velocity relative to a vehicle. FIG. 5 shows an example probe that may be used by the system of FIG. 1, FIG. 6 shows an example port labeling scheme for the probe of FIG. 5, and FIGS. 7A and 7B show an example method for determining wind velocity using the port labeling scheme of FIG. 6. FIG. 8 shows an example communication system that may be used by the system of FIG. 1. FIGS. 9A-9F show CFD simulations used to investigate the system of FIG. 1. FIG. 10 shows an example system for determining wind velocity relative to a railroad car of a train traversing a curve of a track, and FIG. 11 shows an example method that may be used by the system of FIG. 10. FIG. 12 shows an example computer system that may be used by the systems and methods described herein.

FIG. 1 illustrates an example system 100 for determining wind velocity relative to a vehicle. In the illustrated embodiment of FIG. 1, the vehicle is a locomotive 110. System 100 of FIG. 1 includes locomotive 110, tracks 112, one or more probes 130, and one or more controllers 140. System 100 or portions thereof may be associated with an entity, which may include any entity, such as a business, a company (e.g., a railway company, a transportation company, etc.), or a government agency (e.g., a department of transportation, a department of public safety, etc.). The elements of system 100 may be implemented using any suitable combination of hardware, firmware, and software. For example, the elements of system 100 may be implemented using one or more components of the computer system of FIG. 12.

Locomotive 110 represents any railed vehicle equipped to provide power for one or more railroad cars. Locomotive 110 may be used to pull the one or more railroad cars along one or more tracks 112. Locomotive 110 may operate independent of the one or more railroad cars. Locomotive 110 may pull and/or push one or more railroad cars. For example, a rear end 113 of locomotive 110 may be attached to a front end of a first railroad car of a plurality of railroad cars such that locomotive 110 pulls the one or more railroad cars. As another example, a front end 114 of locomotive 110 may be attached to a rear end of a last railroad car of a plurality of railroad cars such that locomotive 110 pushes the one or more railroad cars. As still another example, the one or more railroad cars may have first locomotive 110 attached to a front end of the one or more railroad cars and second locomotive 110 attached to the rear end of the one or more railroad cars for a push-pull operation. The one or more railroad cars may be used to transport goods (e.g., coal, grain, intermodal freight, etc.) and/or beings (e.g., humans, livestock, etc.). Locomotive 110 may be a self-propelled engine driven by electricity, diesel, battery, and/or steam power.

Locomotive 110 may include a front portion 116 and a rear portion 118. Locomotive 110 may be any suitable length measured from front end 114 to rear end 113 of locomotive 110. A centerline 150 of locomotive 110 represents an imaginary line drawn perpendicular to a mid-point of the length of locomotive 110. Front portion 116 of locomotive 110 represents the portion of locomotive 110 from centerline 150 to front end 114 of locomotive 110 and rear portion 118 of locomotive 110 represents the portion of locomotive 110 from centerline 150 to rear end 113 of locomotive 110. Driver's compartment 122 of locomotive 110 represents the portion of locomotive 110 that houses controls necessary to operate locomotive 110 and/or one or more train operators (e.g., a driver, an engineer, a fireman, a driver's assistant, and the like). Driver's compartment 122 of locomotive 110 is located in first portion 116 of locomotive 110.

One or more probes 130 are coupled to locomotive 110. Probes 130 of system 100 represent instruments used to measure wind pressure. Each probe 130 includes one or more ports (e.g., pressure ports 550 of FIG. 5). Each probe 130 directly outputs pressures associated with each of the one or more ports. One or more pressure lines (see, e.g., pressure lines 810 of FIG. 8) may be hard wired to each probe 130 to communicate information to controller 140. Each probe 130 may include one or more sensors operable to communicate information to controller 140. Probes 130 are coupled to locomotive 110 such that at least one probe 130 is not located within an aerodynamic separation zone under any relative wind angle. The relative wind angle may be applied over 360 degrees of relative wind angles. Separation zones may form as airflow separates from the body of locomotive 110 and re-attaches at a region further downwind of locomotive 110. Separation zones are discussed in more detail in FIGS. 9A-9F below.

Each probe 130 is attached to an outer surface of locomotive 110. Probes 130 may be attached to an outer surface of front portion 116 of locomotive 110. For example, probes 130 may be attached to an outer surface of driver's compartment 122 of locomotive 110. Probes 130 may be attached to a top surface of locomotive 110. The top surface of locomotive 110 is the outer surface of locomotive 110 that is visible in a plan view of locomotive 110. In the illustrated embodiment of FIG. 1, the top surface of driver's compartment 122 includes a top flat surface 124 and two top angled surfaces 126 that slope downward toward tracks 112. Each top angled surface 126 shares an edge with top flat surface 124.

In the illustrated embodiment of FIG. 1, probes 130 of system 100 include probe 130a and probe 130b. Probe 130a is located near the intersection of front end 114, top angled surface 126, and a side surface 128 of locomotive 110. Probe 130b may be similarly located on an opposite side of locomotive 110 such that a location of probe 130b mirrors the location of probe 130a about longitudinal axis 160 of locomotive 110.

Controller 140 of system 100 represents any suitable computing component that may be used to process information for system 100. Controller 140 may coordinate one or more components of system 100. Controller 140 may receive data (e.g., wind pressure data) from one or more probes 130 of system 100. Controller 140 may include a communications function that allows users (e.g., a technician, an administrator, a driver, a vehicle operator, etc.) to communicate with one or more components of system 100 directly. For example, controller 140 may be part of a computer (e.g., a laptop computer, a desktop computer, a smartphone, a tablet, etc.), and a user may access controller 140 through an interface (e.g., a screen, a graphical user interface (GUI), or a panel) of the computer. Controller 140 may communicate with one or more components of system 100 via a network (e.g., network 890 of FIG. 8). Controller 140 may be located inside locomotive 110. For example, controller 140 may be located in driver's compartment 122 of locomotive 110. In certain embodiments, controller 140 may be located exterior to locomotive 110. For example, controller 140 may operate in a cloud computing system.

Controller 140 may determine wind direction and/or wind speed relative to a vehicle (e.g., locomotive 110) of system 100 using information received from probes 130. Controller 140 may determine wind direction and/or wind speed relative to the vehicle when the vehicle is in motion. For example, controller 140 may determine wind direction and/or wind speed relative to locomotive 110 in real-time or near real-time as locomotive 110 moves at a calculated speed along track 112. Controller 140 may predict wind-induced tip-over of a vehicle (e.g., the locomotive and/or following cars) based on the determined wind direction and/or wind speed. Wind conditions resulting in tip-over may be determined using CFD simulations, wind tunnel tests, field tests, and the like.

Controller 140 may communicate the determined wind direction and/or wind speed to the entity associated with system 100. For example, controller 140 may communicate the determined wind direction and/or wind speed to an operator (e.g., an operating crew) of locomotive 110. As another example, controller 140 may communicate the determined wind direction and/or wind speed to a back-office system of the entity associated with system 100 to assist in the back office's decision making processes.

In certain embodiments, controller 140 may use the determined wind direction and/or wind speed to verify and/or validate weather information received from one or more weather sources. For example, controller 140 may verify and/or validate forecasted weather data (e.g., forecasted high winds) received from one or more weather sources. This validation process may save time and money by eliminating or reducing the need to dispatch personnel with hand-held anemometers to locations of forecasted high winds. The determined wind direction and/or wind speed provides local conditions at the vehicle (e.g., locomotive 100) at all locations. These conditions may be different from conditions at wayside stations due to impact of local topography, such as canyons, elevated sections of track, hills, and adjacent structures.

In operation, probe 130a and probe 130b coupled to locomotive 110 measure wind pressures while locomotive 110 is in motion and communicate the wind pressures to controller 140. Controller 140 receives the wind pressure measurements from probe 130a and probe 130b and determines a wind angle and a wind speed relative to locomotive 110 using the one or more wind pressure measurements. Controller 140 communicates the wind angle and wind speed to an operator of locomotive 110 to enable the operator to take corrective actions as needed based on the wind angle and the wind speed. For example, the operator may decrease the speed of locomotive 110 to prevent a potential tip-over of locomotive 110. As such, system 100 of FIG. 1 determines wind angle and wind speed relative to locomotive 110, which may prevent a wind-induced tip-over of locomotive 110.

Although FIG. 1 illustrates a particular arrangement of locomotive 110, probe 130a, probe 130b, and controller 140, this disclosure contemplates any suitable arrangement of locomotive 110, probe 130a, probe 130b, and controller 140. Locomotive 110, probe 130a, probe 130b, and controller 140 of system 100 may be physically or logically co-located with each other in whole or in part.

Although FIG. 1 illustrates a particular number of locomotives 110, probes 130, and controllers 140, this disclosure contemplates any suitable number of locomotives 110, probes 130, and controllers 140. For example, more than two probes 130 may be attached to locomotive 110. As another example, locomotive 110 may be part of a train that includes more than one locomotive 110 and/or one or more railroad cars.

Modifications, additions, or omissions may be made to system 100 depicted in FIG. 1. System 100 may include more, fewer, or other components. For example, locomotive 110 of system 100 may be replaced with any suitable component used for transportation such as an automobile, a railroad car, a truck, a bus, an aircraft, a shipping vessel, and the like. As another example, locomotive 110 of system 100 may be any suitable shape.

FIG. 2 illustrates a side view 200 of locomotive 110 of FIG. 1. The illustrated embodiment of FIG. 2 includes locomotive 110 and probe 130a. Locomotive 110 includes front end 114, driver's compartment 122, top flat surface 124, and top angled surface 126. Probe 130a is located at a corner of top angled surface 126.

Probe 130a is physically attached to an outer surface of locomotive 110. Probe 130a may be physically attached to the outer surface of locomotive 110 using one or more magnets, welds, bolts, adhesives, tape, and the like. Probe 130a may be physically attached to locomotive 110 such that probe 130a is fixed in position to locomotive 110. Probe 130a may be restricted from movement independent of locomotive 110. In certain embodiments, probe 130a has no moving parts independent of locomotive 110. Moving parts require more maintenance and are more prone to failure than non-moving parts, especially when poor weather conditions are present. Rugged moving parts are generally not delicate, which is required for accurate measurements.

Probe 130a may be made of metal (e.g., nickel, titanium, copper, iron, steel (e.g., stainless steel), aluminum, etc.), plastic, fabric, a combination thereof, or any other suitable material. Probe 130a may be made of a material that can withstand sun, rain, hail, wind, snow, ice, sleet, and/or other weather conditions. Probe 130a may include one or more components operable to account for one or more weather conditions. For example, probe 130a may include a defrosting component.

Although FIG. 2 illustrates a particular arrangement of locomotive 110 and probe 130a, this disclosure contemplates any suitable arrangement of locomotive 110 and probe 130a. Although FIG. 2 illustrates a particular number of locomotives 110 and probes 130a, this disclosure contemplates any suitable number of locomotives 110 and probes 130a. Modifications, additions, or omissions may be made to side view 200 depicted in FIG. 2. For example, locomotive 110 may be replaced with any suitable component used for transportation such as an automobile, a railroad car, a truck, a bus, an aircraft, a shipping vessel, and the like. As another example, side view 200 may be mirrored such that probe 130a is replaced with probe 130b of FIG. 1. Side view 200 of locomotive 110 may include more, fewer, or other components.

FIG. 3 illustrates a front view 300 of locomotive 110 of FIG. 1. Front view 300 includes locomotive 110 and probes 130. Front end 114 of locomotive 110 includes the components of locomotive 110 illustrated in front view 300. As shown, probe 130a is located on one side of centerline 150 of locomotive 110 and probe 130b is located on an opposite side of centerline 150 of locomotive 110. Each probe 130 is operable to measure wind angles over a range of 180 degrees.

Each probe 130 is coupled to locomotive 110 such that each probe 130 is located within a clearance plate set by AAR Plate M 310 for the AAR Mechanical Division. Rolling stock in the rail industry that fits within AAR clearance plates is guaranteed safe clearance through known tunnels and past other known obstructions. For locomotive 110, the relevant clearance plate is AAR Plate M 310.

AAR Plate M 310 specifies a maximum height 320 and a maximum width 330 for cars. AAR Plate M 310 illustrates a car cross-section that tapers at each top corner. A compliant car (e.g., locomotive 110) must fit within the illustrated cross-section. Accordingly, a compliant car is not permitted to fill an entire rectangle of the maximum height 320 and maximum width 330. The maximum height 320 for plate M is approximately 16'-0" as measured from 2½ inches above the top of the rail of track 112, and the maximum width 330 for plate M is 10'-8".

To comply with AAR Plate M 310, probe 130a and probe 130b each extend a maximum distance (e.g., eight inches) from an outer surface of locomotive 110. The maximum distance depends on the size of locomotive 110 relative to the clearance plate dimensions of AAR Plate M 310. Probe 130a and probe 130b each extend in a direction perpendicular to the outer surface of locomotive 110. In some embodiments, probe 130a and/or probe 130b may extend from the outer surface of locomotive 110 at an angle. For example, probe 130a and/or probe 130b may extend vertically such that probe 130a and/or probe 130 extend perpendicular to a longitudinal axis (e.g., longitudinal axis 160 of FIG. 1) of locomotive 110.

Although FIG. 3 illustrates a particular arrangement of locomotive 110 and probes 130, this disclosure contemplates any suitable arrangement of locomotive 110 and probes 130. Although FIG. 3 illustrates a particular number of locomotives 110 and probes 130, this disclosure contemplates any suitable number of locomotives 110 and probes 130. For example, front view 300 may include more than two probes 130 (e.g., two probes 130 on either side of centerline 150). Modifications, additions, or omissions may be made to front view 300 depicted in FIG. 3. Front view 300 of locomotive 110 may include more, fewer, or other components.

FIG. 4 illustrates an example method 400 for determining wind velocity relative to a vehicle. Method 400 begins at step 410. At step 420, a controller (e.g., controller 140 of FIG. 1) receives wind pressure measurements from one or more probes (e.g., probe 130a and probe 130b of FIG. 1) coupled to a vehicle (e.g., locomotive 110 of FIG. 1). For example, the controller may include transducers (e.g., transducers 820 of FIG. 8), and the transducers may receive wind pressure measurements from one or more ports of the one or more probes. Method 400 then advances to step 430.

At step 430, the controller determines a wind angle relative to the vehicle using the wind pressure measurements received from the one or more probes. The controller may determine the wind angle relative to the vehicle using the method of FIGS. 7A and 7B described below. At step 440, the controller determines a wind speed relative to the vehicle using the wind pressure measurements and the wind angle. The controller may determine the wind speed relative to the vehicle using the method of FIGS. 7A and 7B below.

At step 450, the controller determines a type of vehicle. For example, the controller may determine a specific model of the vehicle (e.g., a specific model of a locomotive). The controller may receive information associated with a specific model of the vehicle such as a height of the vehicle, a width of the vehicle, a length of the vehicle, a shape of the vehicle, one or more components attached to the vehicle, and the like. At step 460, the controller determines a weight of the vehicle. The controller may determine the weight of the vehicle using the information associated with the specific model of the vehicle. Method 400 then advances to step 470.

At step 470, the controller determines whether the vehicle has potential for wind-induced tip-over. The controller may determine whether the vehicle has potential for wind-induced tip-over based on the wind angle relative to the vehicle, the wind speed relative to the vehicle, the type of vehicle, the weight of the vehicle, a combination thereof, or any other suitable factor. For example, the controller may calculate a tipping moment for a locomotive and compare the tipping moment to a restoring moment. The restoring moment is the weight of the locomotive times the horizontal distance from the centerline of the locomotive to the rail. The tipping moment may be determined by comparing relative wind speed and direction to a lookup table based on previous aerodynamic studies for the particular vehicle (e.g., a CFD or wind tunnel study). If the tipping moment is greater than the restoring moment, the vehicle tips. More sophisticated models may include track inputs (e.g., non-smoothness), vehicle suspension details, vehicle rocking and swaying, and the like.

If the controller determines that the vehicle does not have potential for tip-over, method 400 advances from step 470 to step 490, where method 400 ends. If the controller determines that the vehicle has potential for tip-over, method 400 advances from step 470 to step 480, where the controller triggers an alarm. Triggering the alarm may send one or more signals (e.g., a verbal or written message) to an operator of the vehicle. For example, triggering the alarm may send a message to an operator of a locomotive to decrease the speed of the locomotive. In certain embodiments, triggering the alarm may initiate one or more automated actions. The automated actions may include decreasing the speed of the vehicle, stopping the vehicle, activating a siren, changing a direction of the vehicle, and the like. Method 400 then advances from step 480 to step 490, where method 400 ends.

Modifications, additions, or omissions may be made to method 400 depicted in FIG. 4. Method 400 may include more, fewer, or other steps. For example, method 400 may include determining one or more separation zones associated with the vehicle and physically attaching at least one probe to the vehicle outside of the one or more separation zones. As another example, method 400 may include determining one or more clearance plate standards associated with the vehicle and physically attaching the one or more probes to the vehicle such that the locations of the probes comply with the one or more clearance plate standards. As still another example, method 400 may include determining, at step 470, whether each vehicle in a series of vehicles (e.g., a series of railroad cars) has potential for wind-induced tip-over based on the wind angle and wind speed relative to each vehicle. Steps may be performed in parallel or in any suitable order. While discussed as specific components completing the steps of method 400, any suitable component may perform any step of method 400.

FIG. 5 illustrates a probe 130 that may be used by system 100 of FIG. 1. Probe 130 of FIG. 5 may represent probe 130a and/or probe 130b of FIG. 1. Probe 130 is an instrument used to measure wind velocity. As air flow passes over and around probe 130, the shape of probe 130 dictates a velocity pattern on an outer surface of probe 130. Probe 130 includes multiple facets 510 and multiple pressure ports 550. Pressure ports 550 of probe 130 are used to measure static pressures. By comparing the static pressures at the various pressure ports 550 of probe 130, a measurement of wind velocity can be determined.

Probe 130 includes five facets 510. Each facet 510 of probe 130 may be a machined, flat surface. Two or more facets 510 may be equal in width, length, size, shape, or a combination thereof. In certain embodiments, two or more facets 510 may be different in width, length, size, shape, or a combination thereof. A cross section of probe 130 has an outer shape of a pentagon. The pentagon may be a regular pentagon with equal sides and angles. The pentagon may be an irregular pentagon with unequal sides and/or angles. A five-sided probe 130 may offer optimal performance with the fewest pressure differentials, which may minimize cost. In alternative embodiments, probe 130 may include more or less than five facets 510 (e.g., three, four, or six facets 510). For example, probe 130 may include six facets 510 and have a cross-sectional shape of a hexagon. In certain embodiments, probe 130 may have one or more outer curved surfaces. For example, a cross section of probe 130 may have an outer shape of a circular cylinder.

Overall length 512 of probe 130 may be limited by one or more standards (e.g., the AAR standard). For example, overall length 512 of probe 130 may be a maximum of eight inches to fit within the clearance plate associated with AAR plate M. Probe 130 may have any suitable thickness. For example, a maximum thickness of probe 130 may be between two and three inches.

Probe 130 includes a tip 520, a main body 530, and a base 540. Tip 520 of probe 130 has a shape of a spherical cone. A joint between tip 520 and each facet 510 of probe 130 forms a rounded edge. Tip 520 may be any suitable size and shape to accurately determine wind pressure relative to a vehicle. For example, tip 520 may be faceted in certain embodiments. Length 522 of tip 520 may be between 10 and 25 percent of length 512 of probe 130. In certain embodiments, length 522 of tip 520 is within a range of one and two inches.

Main body 522 of probe 130 includes facets 510. Main body 522 has a shape of a regular pentagon. Main body 522 may be any suitable size or shape to accurately determine wind velocity relative to a vehicle. Length 532 of main body 522 may be between 50 and 75 percent of overall length 512 of probe 130. In certain embodiments, length 532 of main body 522 is within a range of four to six inches.

Base 540 of probe 130 has a shape of a cylinder. Base 540 may be any suitable size or shape to accurately determine wind velocity relative to a vehicle. Length 542 of base 540 may be between 20 and 40 percent of overall length 512 of probe 130. In certain embodiments, length 532 of main body 522 is within a range of two to three inches. An outer edge of an end of base 540 attaches to a face of an end of main body 530 such that a joint between main body 530 and base 540 of probe 130 forms a perpendicular edge.

Tip 520, main body 530, and base 540 of probe 130 may be the same material (e.g., metal, plastic, fabric, etc.). In some embodiments, tip 520, main body 530, and base 540 of probe 130 may be different materials. Tip 520, main body 530, and base 540 of probe 130 may be manufactured as a single unit and/or in parts.

Pressure ports 550 of probe 130 are holes in probe 130 used to measure wind pressure (e.g., static pressure), wind speed, and/or wind direction. For example, pressure ports 550 may measure wind pressure, and a comparison of the relative pressure differentials between pressure ports 550 may be used to determine wind angle and/or wind speed relative to a vehicle. Probe 130 may include one or more pressure sensors to measure pressure at pressure ports 550. For example, each pressure port 550 may have its own pressure sensor to measure pressure at that particular port.

Pressure ports 550 may be located on one or more facets 510 of probe 130. For example, three facets 510 of probe 130 may each include a single pressure port 550, whereas the remaining two facets 510 of probe 130 do not include a pressure port 550. Tip 520 may include a pressure port 550. For example, an end of tip 520 located furthest away from main body 530 of probe 130 may include one pressure port 550. Pressure port 550 at tip 520 may be used to measure a reference pressure. The location of the reference pressure port 550 at the end of tip 520 of probe 130 may provide the most ideal location on probe 130 for measuring reference pressure because this location may be relatively insensitive to wind angle. Pressure ports 550 are described in more detail in FIG. 6 below.

Although FIG. 5 illustrates a particular arrangement of facets 510, tip 520, main body 530, base 540, and pressure ports 550, this disclosure contemplates any suitable arrangement of facets 510, tip 520, main body 530, base 540, and pressure ports 550. Modifications, additions, or omissions may be made to probe 130 depicted in FIG. 5. Probe 130 may include more, fewer, or other components. Probe 130 may have more or less than five facets 510. Tip 520, main body 530, and/or base 540 of probe 130 may any suitable shape for measuring wind speed and/or direction. For example, main body 530 of probe 130 may have a cylindrical cross-sectional shape. In certain embodiments, probe 130 may not include tip 520 and/or base 540. One or more components of probe 130 may be implemented using one or more components of the computer system of FIG. 12.

FIG. 6 illustrates a port labeling scheme 600 for probes 130 of FIG. 1. Port labeling scheme 600 may be used by the method of FIGS. 7A and 7B to determine wind direction and wind speed relative to a vehicle. Port labeling scheme 600 shows a schematic plan view of locomotive 110, probe 130a, and probe 130b. In the illustrated embodiment, locomotive 110 is traveling in a direction 610 along longitudinal axis 160 of locomotive 110. Locomotive 110 includes a front side 620, a first side 630, and a second side 640. Front side 620 is located at a front end of locomotive 110.

Probe 130a includes five facets (see, e.g., facets 510 of FIG. 5). The five facets of probe 130a include facet 1a, facet 2a, facet 3a, facet 4a, and facet 5a. Facet 1a is adjacent to facet 2a, facet 2a is adjacent to facet 3a, facet 3a is adjacent to facet 4a, facet 4a is adjacent to facet 5a, and facet 5a is adjacent to facet 1a of probe 130a. Facets 1a, 2a, 3a, 4a, and 5a are connected to form a pentagon. In the illustrated embodiment, facet 2a and first side 630 of locomotive 110 face the same direction. Facets 1a, 2a, and 3a of probe 130a face away from longitudinal axis 160 of locomotive 110 and facets 4a and 5a face toward longitudinal axis 160 of locomotive 110. As such, facets 1a, 2a, and 3a of probe 130a can measure wind angles over a range of zero to 180 degrees.

Probe 130a includes pressure ports (see, e.g., pressure ports 550 of FIG. 5). The pressure ports are used to measure static pressure. The pressure ports of probe 130a include port 1a, port 2a, port 3a, and port 4a. Port 1a is located on facet 1a, port 2a is located on facet 2a, and port 3a is located on facet 3a. In the illustrated embodiment, facets 4a and 5a of probe 130a do not have pressure ports. Pressure ports are not included on facets 4a and 5a in this embodiment because facets 4a and 5a are frequently in a separation zone as locomotive 110 of FIG. 1 travels in direction 610 and are thus not useful. Port 4a is located on the top (e.g., top center) of probe 130a when viewing probe 130a in plan view. Port 4a may be used as a reference pressure measurement.

Similar to probe 130a, probe 130b includes five facets (see, e.g., facets 510 of FIG. 5). The five facets of probe 130b include facet 1b, facet 2b, facet 3b, facet 4b, and facet 5b. Facet 1b is adjacent to facet 2b, facet 2b is adjacent to facet 3b, facet 3b is adjacent to facet 4b, facet 4b is adjacent to facet 5b, and facet 5b is adjacent to facet 1b. Facets 1b, 2b, 3b, 4b, and 5b are connected to form a pentagon. In the illustrated embodiment, facet 2b and second side 640 of locomotive 110 face the same direction. Facets 1b, 2b, and 3b of probe 130b face away from longitudinal axis 160 of locomotive 110 and facets 4b and 5b face toward longitudinal axis 160 of locomotive 110. As such, facets 1b, 2b, and 3b of probe 130b can measure wind angles over a range of zero to 180 degrees. The combination of facets 1a, 2a, and 3a of probe 130a and facets 1b, 2b, and 3b of probe 130b can measure wind angles over a range of zero to 360 degrees.

Similar to probe 130a, probe 130b includes pressure ports (see, e.g., pressure ports 550 of FIG. 5). The pressure ports of probe 130b include port 1b, port 2b, port 3b, and port 4b. Port 1b is located on facet 1b, port 2b is located on facet 2b, and port 3b is located on facet 3b. In the illustrated embodiment, facets 4b and 5b of probe 130b do not have pressure ports. Port 4b is located on the top (e.g., top center) of probe 130b when viewing probe 130b in plan view. Port 4b may be used as a reference pressure measurement.

Although FIG. 6 illustrates a particular arrangement of facets and pressure ports within port labeling scheme 600, this disclosure contemplates any suitable arrangement of facets and ports within port labeling scheme 600 that can be used to accurately determine wind angle and wind speed relative to a vehicle. Modifications, additions, or omissions may be made to port labeling scheme 600 depicted in FIG. 6. Port labeling scheme 600 may include more, fewer, or other components. For example, probe 130a and/or probe 130b of port labeling scheme 600 may have more or less than five facets (e.g., three, four, or six facets). As another example, each probe 130 of port labeling scheme 600 may have more or less than four pressure ports.

Although FIG. 6 illustrates a particular number of probes 130 within port labeling scheme 600, this disclosure contemplates any suitable number of probes 130 within port labeling scheme 600 that can be used to accurately determine wind angle and wind speed relative to a vehicle. For example, port labeling scheme 600 may be used for an aerodynamic vehicle such that a single probe 130a with pressure ports on all facets may be used to accurately determine wind angle and wind speed relative to the vehicle over a full 360 degrees.

FIGS. 7A and 7B illustrate a method 700 for determining wind velocity in accordance with the port labeling scheme of FIG. 6. FIGS. 7A and 7B may be used by system 100 of FIG. 1 to determine wind velocity relative to locomotive 110. Method 700 starts at step 705. At step 710, a controller (e.g., controller 140 of FIG. 1) determines air pressures associated with facets of a first probe. The controller determines a first facet pressure $p_{1a}$, a second facet pressure $p_{2a}$, and a third facet pressure $p_{1a}$ associated with a port of a first facet, a port of a second facet, and a port of a third facet, respectively, of the first probe (e.g., ports 1a, 2a, and 3a, respectively, of probe 130a of FIG. 6). The controller further determines a reference pressure $p_{4a}$ associated with a port at an end of the first probe (e.g., port 4a of probe 130a of FIG. 6).

At step 715, the controller determines air pressures associated with facets of a second probe. The controller determines a first facet pressure $p_{1b}$, a second facet pressure $p_{2b}$, and a third facet pressure $p_{3b}$ associated with a port of a first facet, a port of a second facet, and a port of a third facet, respectively, of the second probe (e.g., ports 1b, 2b, and 3b, respectively, of probe 130b of FIG. 6). The controller further determines a reference pressure $p_{4b}$ associated with a port at an end of the second probe (e.g., port 4b of probe 130b of FIG. 6).

At step 720, the controller determines pressure differentials between each facet pressure and the reference pressure associated with the first probe. Pressure differentials are calculated by taking a difference between values associated with two pressures. For the first probe, the controller determines a first reference differential $(p_{1a}-p_{4a})$ between first facet pressure $p_{1a}$ and reference pressure $p_{4a}$ associated with the first probe, a second reference differential $(p_{2a}-p_{4a})$ between the second facet pressure $p_{2a}$ and the reference pressure $p_{4a}$ associated with the first probe, and a third reference differential ($p_{1a}$-$p_{4a}$) between the third facet pressure $p_{1a}$ and the reference pressure $p_{4a}$ associated with the first probe.

At step 725, the controller determines pressure differentials between each facet pressure and the reference pressure associated with the second probe. The controller determines a first reference differential ($p_{1a}$-$p_{4b}$) between the first facet pressure $p_{1b}$ and the reference pressure $p_{4b}$ associated with the second probe, a second reference differential ($p_{2b}$-$p_{4b}$) between the second facet pressure $p_{2b}$ and the reference pressure $p_{4b}$ associated with the second probe, and a third reference differential ($p_{3b}$-$p_{4b}$) between the third facet pressure $p_{3b}$ and the reference pressure $p_{4b}$ associated with the second probe. Method 700 then advances to step 730.

At step 730, the controller compares a facet pressure of the first probe to a facet pressure of the second probe to determine whether to use pressure differentials associated with the first probe or the second probe to calculate wind velocity. In certain embodiments, the probe that is not selected for use in determining wind velocity may be located in a separation zone, whereas the selected probe may be located outside of the separation zone and may therefore more accurately determine wind velocity. The controller determines a pressure differential ($p_{2b}$-$p_{2a}$) between second facet pressure $p_{2a}$ of the first probe and second facet pressure $p_{2b}$ of the second probe. Method 700 then advances to step 735.

At step 735, the controller determines whether the pressure differential is greater than zero (($p_{2b}$-$p_{2a}$)>0). If the pressure differential is greater than zero, method 700 advances from step 735 moves to step 740, where the controller selects the second probe and uses pressures associated with the second probe to determine wind velocity. If the pressure differential is not greater than zero at step 735, then the controller advances to step 745, where the controller selects the first probe and uses pressures associated with the first probe to determine wind velocity. Method 700 advances from step 740 and step 745 to step 750.

At step 750, the controller determines whether the first reference differential is greater than the second reference differential of the selected probe (($p_{1s}$-$p_{4s}$)>($p_{2s}$-$p_{4s}$)). The selected probe represents either the first probe or the second probe selected in step 740 or step 745 above. If the first reference differential is greater than the second reference differential of the selected probe, then method 700 advances from step 750 to step 755, where the controller determines a first rotational differential ($p_{1s}$-$p_{2s}$) between the first facet pressure $p_{1a}$ and the second facet pressure $p_{2a}$ of the selected probe. At step 760, the controller determines an angular coefficient $k_a$ by dividing the first reference differential by the first rotational differential (($p_{1s}$-$p_{2s}$)/($p_{1s}$-$p_{4s}$)). Angular coefficient $k_a$ is functionally related to the wind angle such that the wind angle is f($k_a$). The function is relatively insensitive to wind speed. The relationship of $k_a$ to the wind angle may be irregular and a curve fit may be employed. The process of finding the curve fit will id determined during a calibration process.

After determining the wind angle at step 760, method 700 advances to step 765, where the controller calculates wind velocity $V_w$ relative to a vehicle (e.g., locomotive 110 of FIG. 1) using the following formula: $V_w = K_v * sqrt((p_{1s}-p_{4s})/\rho)$. Value $K_v$ represents a velocity calibration coefficient that is determined as a function of the wind angle. The functional relationship is determined by the calibration process. Value $\rho$ represents air density that is determined based on the atmospheric air pressure and a temperature. The atmospheric air pressure and temperature are associated with the vehicle and may be determined using one or more components (e.g., an atmospheric pressure device and a temperature sensor) of the communication system of FIG. 8 discussed below. Method 700 advances from step 765 to step 798, where method 700 ends.

At step 750, if the controller determines that the first reference differential is not greater than the second reference differential of the selected probe, then method 700 advances from step 750 to step 770, where the controller determines whether the second reference differential is greater than the third reference differential of the selected probe (e.g., ($p_{2a}$-$p_{4a}$)>($p_{3a}$-$p_{4a}$)). If the second reference differential is greater than the third reference differential of the selected probe, then the controller advances from step 770 to step 775, where the controller determines a second rotational differential (e.g., $p_{1s}$-$p_{3s}$) between the first facet pressure (e.g., $p_{1a}$) and the third facet pressure (e.g., $p_{3a}$) of the selected probe. The controller may determine a third rotational differential (e.g., $p_{2s}$-$p_{3s}$) between the second facet pressure (e.g., $p_{2a}$) and the third facet pressure (e.g., $p_{3a}$) of the selected probe. Method 700 then advances to step 780.

At step 780, the controller determines angular coefficient $k_a$ by dividing the second reference differential of the selected probe by the second rotational differential ($p_{1s}$-$p_{3s}$)/($p_{2s}$-$p_{4s}$). In certain embodiments, the controller may determine angular coefficient $k_a$ by dividing the second reference differential of the selected probe by the third rotational differential ($p_{2s}$-$p_{3s}$)/$p_{2s}$-$p_{4s}$). The selection of whether to use the second or third rotational differential at step 780 may be arbitrary. Method 700 then advances from step 780 to step 785, where the controller calculates wind velocity $V_w$ using the following formula: $V_w = K_v * sqrt((p_{2s}-p_{4s})/\rho)$. Method 700 then advances from step 785 to step 798, where method 700 ends.

At step 770, if the controller determines that the second reference differential is not greater than the third reference differential of the selected probe (e.g., ($p_{2a}$-$p_{4a}$)>($p_{3a}$-$p_{4a}$)), then the controller advances from step 770 to step 790, where the controller determines a fourth rotational differential (e.g., $p_{3s}$-$p_{2s}$) between the third facet pressure (e.g., $p_{3s}$) and the second facet pressure (e.g., $p_{2s}$) of the selected probe. Method 700 then advances to step 795.

At step 795, the controller determines angular coefficient $k_a$ by dividing the third reference differential of the selected probe by the fourth rotational differential ($p_{3s}$-$p_{2s}$)/$p_{3s}$-$p_{4s}$). Method 700 then advances from step 795 to step 796, where the controller calculates wind velocity $V_w$ using the following formula: $V_w = K_v * sqrt((p_{2s}-p_{4s})/\rho)$. Method 700 then advances from step 796 to step 798, where method 700 ends.

As such, method 700 compares pressure differentials between each facet pressure and a reference pressure of a probe to determine an approximate wind direction. These pressure differentials are called reference differentials. A rotational differential, which is a pressure differential between various facet pressures, is divided by the selected reference differential to determine the angular coefficient. The angular coefficient is functionally related to the wind angle. The wind angle is in turn functionally related to the velocity calibration coefficient, which is used to determine wind velocity. The wind velocity is relative to the vehicle upon which the probe is attached.

Each probe is calibrated prior to determining wind velocity. One or more facets of each probe may be calibrated separately over a predetermined wind angle range. For example, facets 1a, 2a, and 3a of probe 130a of FIG. 6 may be calibrated to cover a range of 0 degrees to 180 degrees of wind angle. Each probe is inserted into a wind tunnel and rotated relative to the flow direction. Probe calibration is performed at one or more wind tunnel velocities (e.g., 50 miles per hour). Pressure differentials are read for all test points prior to processing. Calibration wind velocities are selected in relation to one or more purposes of the system. For example, if the purpose of the system is to prevent wind induced tip-overs of a railroad car, then the calibration may be performed at the lowest wind speed capable of tipping an empty railroad car.

When all data are taken, an analyst calibrates the data. Data received from the wind tunnel system are used to associate the known wind angles with measured pressure differentials for each facet with a port. The calibration of each face extends a certain amount (e.g., one point) beyond the determined limits. Each facet with a port is calibrated separately. Each calibration is a curve fit of the parameters calculated from data taken in the wind tunnel. A human (e.g., an analyst) or a machine (e.g., a processor) may calibrate the wind tunnel data.

The relative wind angle and wind speed measured directly by the probe will differ from the actual relative wind angle and direction due to the presence of the body of the vehicle (e.g., the locomotive body.) A correlation between measured wind speed and wind direction (i.e., wind speed and wind direction at the probe location) versus actual relative wind speed and direction (i.e., wind speed and direction relative to the vehicle as a whole) is determined. The preliminary body correction may be determined using a CFD model, one or more lookup tables, etc. The preliminary body correction may be different for each vehicle type and each probe position.

The method for determining the preliminary body correction may be tested using a specially instrumented test vehicle (e.g., locomotive) to validate and/or improve the preliminary body correction. This correction may then be considered valid for every vehicle of that specific model unless probe locations change.

Modifications, additions, or omissions may be made to method 700 depicted in FIGS. 7A and 7B. For example, method 700 may determine facet pressures for more or less than two probes. As another example, method 700 may determine more or less than three facet pressures and one reference pressure for each probe. As still another example, method 700 may modify step 730 to determine pressure differential ($p_{1b}$-$p_{1a}$) in place of or in addition to ($p_{2b}$-$p_{2a}$). Method 700 may include more, fewer, or other steps. For example, step 710 and step 715 may be eliminated such that the controller determines differential pressures without determining individual facet pressures. Steps may be performed in parallel or in any suitable order. While discussed as specific components completing the steps of method 700, any suitable component may perform any step of method 700.

FIG. 8 illustrates a communications system 800 that may be used by system 100 of FIG. 1. Communications system 800 includes probe 130a, probe 130b, controller 140, pressure lines 810, transducers 820, a data acquisition system 840, a processor 850, atmospheric pressure device 860, a temperature device 862, a compass 864, a Global Positioning System (GPS) device 866, a locomotive computer 870, a display 880, and a network 890.

Probe 130a and probe 130b, which are described above in FIG. 1, are coupled to a vehicle (e.g., locomotive 110 of FIG. 1) and used to measure wind velocity relative to the vehicle. Probe 130a directly outputs four pressures associated with ports 1a, 2a, 3a, and 4a of probe 130a. Probe 130b directly outputs four pressures associated with ports 1b, 2b, 3b, and 4b of probe 130b. Controller 140, which is described above in FIG. 1, may include transducers 820, data acquisition system 840, and processor 850.

Pressure lines 810 include four pressure lines 1a, 2a, 3a, and 4a coupled (e.g., hard wired) to probe 130a and four pressure lines 1b, 2b, 3b, and 4b coupled (e.g., hard wired) to probe 130b. Pressure lines 1a, 2a, 3a, and 4a are routed from ports 1a, 2a, 3a, and 4a, respectively, of probe 130a to transducers 820. Pressure lines 1b, 2b, 3b, and 4b are routed from ports 1b, 2b, 3b, and 4b, respectively, of probe 130b to transducers 820. Pressure lines 810 may be routed through a base of each probe 130a and 130b and through a hole in the roof of the vehicle (e.g., locomotive 110 of FIG. 1). In certain embodiments, pressure lines 810 may be routed through openings (e.g., windows and/or vents) of the vehicle.

Pressure lines 810 may be plumbed into a set of eleven transducers 820. Transducers 820 of communications system 800 are instruments that measure differential pressure. Transducers 820 may be differential pressure transducers, gauges, sensors, differential pressure transmitters, capacitive pressure transducers, digital output pressure transducers, voltage/current output pressure transducers, a combination thereof, and/or any other suitable device for measuring differential pressure. Transducers 820 may sense a difference in pressure between two ports of probes 130a and/or 130b and generate an output signal.

Transducers 820 include the following eleven transducers: 821, 822, 823, 824, 825, 826, 827, 828, 829, 830, and 831. Transducer 821 measures a differential pressure (e.g., first reference differential ($p_{1a}$-$p_{4a}$) of FIG. 7A) between ports 1a and 4a of probe 130a; transducer 822 measures a differential pressure (e.g., rotational differential ($p_{1s}$-$p_{2s}$) of FIG. 7A) between ports 1a and 2a of probe 130a; transducer 823 measures differential pressure (e.g., second reference differential ($p_{2a}$-$p_{4a}$) of FIG. 7A) between ports 2a and 4a of probe 130a; transducer 824 measures differential pressure (e.g., rotational differential ($p_{2s}$-$p_{3s}$) of FIG. 7B) between ports 2a and 3a of probe 130a; transducer 825 measures differential pressure (e.g., third reference differential ($p_{1a}$-$p_{4a}$) of FIG. 7B) between ports 3a and 4a of probe 130a; transducer 826 measures differential pressure (e.g., first reference differential ($p_{1b}$-$p_{4b}$) of FIG. 7A) between ports 1b and 4b of probe 130b; transducer 827 measures differential pressure (e.g., rotational differential ($p_{1s}$-$p_{2s}$) of FIG. 7A) between ports 1b and 2b of probe 130b; transducer 828 measures differential pressure (e.g., second reference differential ($p_{2b}$-$p_{4b}$) of FIG. 7A) between ports 2b and 4b of probe 130b; transducer 829 measures differential pressure (e.g., rotational differential ($p_{2s}$-$p_{3s}$) of FIG. 7B) between ports 2b and 3b of probe 130b; transducer 830 measures differential pressure (e.g., third reference differential ($p_{3b}$-$p_{4b}$) of FIG. 7A) between ports 3b and 4b of probe 130b; and transducer 831 measures differential pressure (e.g., pressure differential ($p_{2b}$-$p_{2a}$) of FIG. 7A) between ports 2a and 2b of probe 130a and probe 130b.

Eight pressure lines (i.e., pressure lines 1a, 2a, 3a, and 4a of probe 130a and pressure lines 1b, 2b, 3b, and 4b of probe 130b) couple ports 1a, 2a, 3a, and 4a of probe 130a and ports 1b, 2b, 3b, and 4b of probe 130b to eleven transducers 820 (i.e., transducers 821 through 831.) Pressure line 1a is coupled to port 1a of probe 130a and transducers 821 and 822. Pressure line 2a is coupled to port 2a and transducers 822, 823, 824, and 831. Pressure line 3a is coupled to port 3a of probe 130a and transducers 824 and 825. Pressure line 4a is coupled to port 4a and transducers 821, 823, and 825. Pressure line 1b is coupled to port 1b of probe 130b and transducers 826 and 827. Pressure line 2b is coupled to port 2b and transducers 827, 828, 829, and 831. Pressure line 3b is coupled to port 3b of probe 130a and transducers 829 and 830. Pressure line 4b is coupled to port 4b and transducers 826, 828, and 830.

Each transducer 820 is coupled to a data acquisition system 840. Data acquisition system 840 is a system that samples one or more components of communication system 800. Data acquisition system 840 may convert one or more signals received from one or more components of communication system 800 to one or more digital signals. Data acquisition system 840 may sample one or more transducers 820, atmospheric pressure device 860, temperature device 862, compass 864, GPS 866, a combination thereof, or any other component of communication system 800. Data acquisition system 840 may receive signals from one or more components of a vehicle (e.g., locomotive 110 of FIG. 1) such as track speed and curve information. Data acquisition system 800 may convert the received signals to digital signals. These digital signals may be processed by processor 850 to calculate wind speed and wind angle relative to the vehicle. The processed data may be presented to an engineer (e.g., a locomotive engineer). The processed data may be available for input into electronics associated with the vehicle.

Data acquisition system 840 is coupled to processor 850. Processor 850 controls certain operations of communications system 800 by processing information received from one or more components (e.g., transducers 820) of communications system 800. Processor 850 communicatively couples to one or more components of system 800. Processor 850 may include any hardware and/or software that operates to control and process information. Processor 850 may be a programmable logic device, a microcontroller, a microprocessor, any suitable processing device, or any suitable combination of the preceding. Processor 850 may be included in controller 140 of communication system 800. Alternatively, processor 850 may be located externally to controller 140, such as in a cloud computing environment. Processor 850 may be located in any location suitable for processor 850 to communicate with one or more components of communications system 800.

Atmospheric pressure device 860 is a device used to measure atmospheric pressure. Atmospheric pressure device 860 may be an electronic instrument that stores atmospheric pressure on a computer. Atmospheric pressure device 860 may be a barometer (e.g., a mercury or aneroid barometer), a barometric sensor (e.g., a barometric air pressure sensor), a manometer, a combination of the preceding, or the like. Atmospheric pressure device 860 may be located internally or externally to controller 140. Atmospheric pressure device 860 may be coupled to the vehicle associated with communication system 800.

Temperature device 862 is a device used to measure outside temperature. Temperature device 862 may be a temperature sensor (e.g., a mechanical or an electrical temperature sensor). Temperature device 862 may be located near probe 130a and/or 130b. For example, temperature device 862 may be physically attached to probe 130a or probe 130b. As another example, temperature device 862 may be located within a predetermined distance (e.g., one foot) of probe 130a or probe 130b.

Processor 850 may determine air density using an atmospheric pressure value as measured by atmospheric pressure device 860 and an outside temperature value as measured by temperature device 862. Air density is equal to atmospheric pressure divided by outside temperature and the gas constant for air. Air density may be calculated using one or more principles of perfect gas law. Air density may be used to determine wind velocity relative to the vehicle associated with communication system 800, as illustrated in FIGS. 7A and 7B above.

Compass 864 of communication system 800 is a device used to determine geographic direction. Compass 864 may be a standard magnetic compass, a differential compass, an electronic compass, a magnetometer, a gyrocompass, a combination thereof, or any other suitable device used to determine geographical direction. Compass 864 may include one or more electronic sensors. Compass 864 may be configured to switch to a differential mode when compass 864 reaches a predetermined speed. In differential mode, compass 864 may use GPS to periodically record the position of compass 864. Compass 864 may compare positions to determine a direction of a vehicle (e.g., locomotive 110 of FIG. 1) and/or to indicate the current bearing of the vehicle. Compass 864 may be integrated with GPS device 866.

GPS device 866 is a device that receives information from GPS satellites and uses this information to calculate the geographical position of GPS device 866. GPS device 866 may display the position on a display of GPS device 866. GPS device 866 may display the position on a map. GPS device 866 may determine one or more directions of a vehicle (e.g., locomotive 110 of FIG. 1) using information from compass 862. One or more components of system 800 may store time-histories of the readings of GPS device 866 to determine direction. GPS device 866 may be integrated with compass 862.

Locomotive computer 870 is a computer on-board a vehicle (e.g., locomotive 110 of FIG. 1) that performs logical control of the vehicle. Locomotive computer 870 may receive signals (e.g., digital and/or analog inputs) from one or more components (e.g., one or more microprocessors) of the vehicle. Locomotive computer 870 may perform diagnostics, such as checking for abnormalities in the operation of the vehicle. Processor 850 may query locomotive computer 870 to gather the information from one or more databases (e.g., a track database) stored on a network (e.g., a network of a railroad). Locomotive computer 880 is located on-bound the vehicle. Locomotive computer 870 may report information (e.g., a type or location of an actual or potential misfunction) to display 880. Locomotive computer 880 may include one or more components of the computer of FIG. 12.

Display 880 is a visual device that visually communicates information to an operator of a vehicle. Display 880 may communicate information including wind direction relative to the vehicle, wind speed relative to the vehicle, potential wind-induced tip-over information, information related to track conditions, alarms, instructions, and the like. Display 880 may communicate information that allows the engineer of the vehicle to make decisions. For example, display 880 may visually display instructions that alert the engineer of a potential tip-over so that the engineer can reduce the speed of the vehicle.

One or more components of communications system 800 may be connected by a network 890. Network 890 may be any type of network that facilitates communication between components of system 800. One or more portions of network 890 may include Center for Transportation Analysis (CTA) Railroad Network. Although this disclosure shows network 890 as being a particular kind of network, this disclosure contemplates any suitable network. One or more portions of network 890 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 890 may include one or more access (e.g., mobile access), core, and/or edge networks. Network 890 may be any communications network, such as a private network, a public network, a connection through Internet, a mobile network, a WI-FI network, a Bluetooth network, etc. Network 890 may include one or more network nodes. Network nodes are connection points that can receive, create, store, and/or transmit data throughout network 890. Network 890 may include cloud computing capabilities. One or more components of system 800 may communicate over network 890. For example, controller 140 and/or locomotive computer 870 may communicate over network 890 to receive information from one or more databases (e.g., a track database) stored on network 890.

Although FIG. 8 illustrates a particular arrangement of probes 130, controller 140, pressure lines 810, transducers 820, data acquisition system 840, processor 850, atmospheric pressure device 860, temperature device 862, compass 864, GPS device 866, locomotive computer 870, display 880, and network 890, this disclosure contemplates any suitable arrangement of probes 130, controller 140, pressure lines 810, transducers 820, data acquisition system 840, processor 850, atmospheric pressure device 860, temperature device 862, compass 864, GPS device 866, locomotive computer 870, display 880, and network 890. The elements of communication system 800 may be implemented using any suitable combination of hardware, firmware, and software. For example, the elements of communication system 800 may be implemented using one or more components of the computer system of FIG. 12.

Modifications, additions, or omissions may be made to communications system 800 depicted in FIG. 8. Communications system 800 may include more, fewer, or other components. For example, communications system 800 may include more or less than two probes 130, more or less than three ports per probe 130, and/or more or less than eleven transducers 820. One skilled in the art would recognize that an embodiment utilizing a different number of probes and/or ports than illustrated in communication system 800 of FIG. 8 may change the number of pressure lines 810 and/or transducers 820. As another example, compass 864 and GPS device 866 may be a single device.

FIGS. 9A-9F show CFD simulations used to investigate certain components of system 100 of FIG. 1. FIG. 9A shows a CFD model domain used to investigate components of system 100 of FIG. 1 and FIG. 9B shows a train used in the CFD model domain of FIG. 9A. FIG. 9C shows a plan view of a simulated airflow around the train of FIG. 9B, FIG. 9D shows a front view of a simulated airflow around the train of FIG. 9B, and FIG. 9E shows a perspective view of a simulated airflow around the train of FIG. 9B. FIG. 9F shows a top view of a simulated airflow around a probe of FIG. 9E.

FIG. 9A illustrates a CFD model domain 900 used to investigate system 100 of FIG. 1. Specifically, CFD domain 900 illustrates the modeling parameters used to simulate airflow around an object. CFD domain 900 is a volume in which an airflow takes place. CFD domain 900 may be created on any suitable computing device (e.g., a desktop computer, a laptop computer, a smartphone, a tablet, etc.) using any suitable CFD software. CFD domain 900 may be constructed around a geometry of a solid object, such as a locomotive, a railroad car, an automobile, a truck, a car, a bus, an aircraft, a shipping vessel, and the like. In the illustrated embodiment of FIG. 9A, the solid object is train 910. CFD domain 900 may be constructed by forming a box 920 or any other suitable shape around the geometry such that the object is contained within box 920. In the illustrated embodiment of FIG. 9A, box 920 is 360 feet wide, 360 feet long, and 185 feet high (i.e., 185 feet above railroad track 930). The flow domain for the external flow analysis may be calculated by subtracting the geometry from the volume of box 920. In the illustrated embodiment, CFD domain 900 uses 63,000,000 computational cells concentrated around train 910.

FIG. 9B illustrates train 910 used in CFD domain 900 of FIG. 9A. Train 910 includes locomotives 110 of FIG. 1 and railroad cars 930. Locomotives 110 include locomotive 110*a* and locomotive 110*b*. In the illustrated embodiment, locomotive 110*a* and locomotive 110*b* are each an Electro Motive Division (EMD) SD70M locomotive, which is a type of 4,000 hp six-axle diesel locomotive. Locomotives 110 are situated on a single track 112 having a 3-foot berm with 30-degree slopes.

FIG. 9B shows a wind angle 940 relative to train 910. As illustrated, a 0-degree wind angle may be applied perpendicular to and toward a front end 114 of train 910 (e.g., front end 114 of locomotive 110*a*) such that the applied wind is parallel to the sides of train 910 and in a direction from front end 114 to rear end 113 of train 910. A 180-degree wind angle may be applied perpendicular to and toward a rear end 113 of train 910 such that the applied wind is parallel to the sides of train 910 and in a direction from rear end 113 to front end 114 of train 910. A 90-degree wind angle may be applied perpendicular to a side of train 910. Wind angle 940 may be applied to train 910 at any angle ranging from zero to 360 degrees.

FIG. 9C illustrates a plan view 950 of a simulated airflow around train 910 of FIG. 9B as used in CFD domain 900 of FIG. 9A. FIG. 9C shows an airflow path around train 910. Train 910 includes locomotives 110 (i.e., locomotives 110*a* and 110*b*) and railroad cars 930. Locomotives 110 and railroad cars 930 are bluff bodies from an aerodynamic perspective. The simulated wind speed in CFD domain 900 is 50 miles per hour with an angle of 45 degrees relative to a longitudinal axis of train 910. In the illustrated embodiment of FIG. 9C, plan view 950 is taken 2.70 meters above railroad tracks 112 of FIG. 9A. The simulated wind speed in CFD domain 900 generates airflow path-lines 955.

As illustrated by air flow path-lines 955 in FIG. 9C, air passes around locomotives 110. The air is unable to remain attached to train 910 and instead slides across the body of each locomotive 110 and each railroad car 930. Air flow path-lines 950 separate (i.e., detach) from the body of each locomotive 110 and each railroad car 930. As air flow separates from the body of train 910 and re-attaches at a region further downwind of train 910, one or more separation zones 970 may form. If a probe (e.g., probe 130 of FIG. 1) sits in separation zone 970, the probe may be unable to accurately measure wind velocity. One or more probes used to measure wind velocity may be located outside of separation zones 970 under any possible wind angle (i.e., zero to 360 degrees.) Probes may be located outside of one or more separation zones 970 at some wind angles and within one or more separation zones 970 at other wind angles. The locations of probes 130 in FIG. 1 satisfy the requirements of at least one probe located outside of separations zones 970 by locating first probe 130*a* and second probe 130*b* on opposite sides of locomotive 110. Each probe 130*a* and 130*b* of FIG. 1 can measure wind angles over a range of zero to 180 degrees.

FIG. 9D illustrates a front view 960 of a simulated airflow around train 910 of FIG. 9B as used in CFD domain 900 of FIG. 9A. Front view 960 is cut through locomotive 110*a* of train 910. Specifically, front view 960 is cut through the locations of probes 130*a* and 130*b* attached to locomotive 110 as illustrated in FIG. 1. Air flow path-lines 965 are generated in result of a simulated wind speed in CFD domain 900 of FIG. 9A of 50 miles per hour with an angle of 45 degrees relative to a longitudinal axis of locomotive 110*a*. This model was taken to investigate the locations of probe 130*a* and probe 130*b* of FIG. 1. Based on this model, a determination was made that the probes should be located such that at least one probe penetrates into the air velocity field at every possible wind angle. As previously discussed in FIG. 3, all probes should be located within the clearance plate associated with AAR Plate M 310.

FIG. 9E illustrates a perspective view 970 of a simulated airflow around train 910 of FIG. 9B as used in CFD domain 900 of FIG. 9A. Specifically, FIG. 9E shows simulated airflow past a probe (e.g., probe 130*a* of FIG. 1) attached to locomotive 110*a* of train 910. Air flow path-lines 975 are generated using a simulated wind speed in CFD domain 900 of 50 miles per hour with an angle of 45 degrees relative to a longitudinal axis of locomotives 110. The applied wind angle of 45 degrees is applied to a first side 630 of locomotive 110*a*. As illustrated in FIG. 9E, air flow path-lines 975 intersect probe 130*a* and circumvent probe 130*b*. In an embodiment where the wind is applied to a second side of locomotive 110*a* that is opposite first side 630 of locomotive 110*a*, air flow path-lines 975 will intersect probe 130*b* and circumvent probe 130*a*. Thus, in certain embodiments, two probes are used to determine airflow to accurately account for all possible wind flow directions (e.g., wind flow directions from 0 to 360 degrees).

FIG. 9F shows a top view of a simulated airflow around probe 130*a* of FIG. 9E. Air flow path-lines 985 are generated using a simulated wind speed in CFD domain 900 of FIG. 9A of 50 miles per hour with an angle of 45 degrees relative to a longitudinal axis of locomotive 110*a*. As illustrated, air flow path-lines 985 change direction as airflow passes probe 130*a*. The total velocity of the airflow changes as airflow passes probe 130*a*.

As such, FIGS. 9A-9F illustrate simulated airflow around train 910 and probes 130, which may provide guidance in determining the shape of probes 130, the placement of probes 130 on a vehicle, and the orientation of probes 130 relative to the vehicle.

FIG. 10 illustrates an example system 1010 for determining wind velocity relative to each railroad car of train 910 traversing a curve 1050 of track 112. System 1010 includes train 910, track 112, probes 130, and controller 140. Train 910 includes locomotive 110*a*, railroad car 930*a*, and railroad car 930*b*. Probes 130 are located on locomotive 110*a* of train 910. System 1010 or portions thereof may be associated with an entity, which may include any entity, such as a business, company (e.g., a railway company, a transportation company, etc.), or a government agency (e.g., a department of transportation, a department of public safety, etc.). The elements of system 1010 may be implemented using any suitable combination of hardware, firmware, and software. For example, the elements of system 1010 may be implemented using one or more components of the computer system of FIG. 12.

Track 112 of system 1010 includes an inner rail 1020 and an outer rail 1030. A centerline of track 112 is located at a midpoint between inner rail 1020 and outer rail 1030 of track 112. Track 112 includes curve 1050. Curve 1050 is a section of track 112 that deviates from being straight along all or some of its length. Radius 1060 of curve 1050 is a distance from a point 1062 along centerline 1040 of curve 1050 to a point 1064 at a center of an imaginary circle 1066 encompassing curve 1050. Locomotive 110*a*, railroad car 930*a*, and railroad car 930*b* of train 910 traverse curve 1050 of track 112.

As train 910 traverses curve 1050 of track 112, a heading of each car (i.e., locomotive 110*a*, railroad car 930*a*, and railroad car 930*b*) of train 910 traversing curve 1050 differs with position of each car on curve 1050. As such, relative wind speed and wind direction for each car also differs with position of each car on curve 1050. Accurately determining wind speed and wind direction relative to each car on curve 1050 may prevent wind-induced tip-over of one or more cars of train 910.

Wind speed and wind direction relative to railroad car 930*a* and railroad car 930*b* of train 910 may be determined using the wind speed and wind direction relative to locomotive 110*a*. Wind speed and wind direction relative to locomotive 110*a* may be determined using wind pressure values received from probes 130. Wind speed and wind direction relative to locomotive 110*a* may be determined in accordance with method 700 of FIG. 7. Controller 140 may calculate an absolute wind speed and absolute wind direction relative to ground using the following information: wind speed and wind direction relative to locomotive 110*a*, a track speed, and/or a compass (e.g., an electronic compass, a magnetic compass, a differential compass, a magnetometer, a gyrocompass, etc.). For example, controller 140 may receive one or more readings from a compass (e.g., compass 864 of FIG. 8) to determine true North direction relative to ground. Controller 140 may then determine absolute wind speed and wind direction relative to the compass reading. Once an orientation of a given car in train 910 is known, wind velocity relative to the given car can be calculated.

Controller 140 may receive a track speed from one or more components of train 910 (e.g., locomotive computer 870 of FIG. 8). Track speed is typically measured on standard locomotives. All cars of train 910 will have the same track speed regardless of the heading of each individual car. If the cars of train 910 are still, the relative wind speeds for all cars are the same, although the wind angle is different. If train 910 is moving, then the relative wind velocity vector (based on relative wind speed and direction) is added to the velocity vector (based on ground speed and track direction) of locomotive 110*a* using vector addition to calculate an absolute wind velocity vector. The absolute wind velocity vector is then added, using vector addition, to the velocity vector (which has the same train speed but a different direction) of railroad car 930*a* or 930*b* to determine the relative wind velocity vector for railroad car 930*a* or 930*b*, respectively.

Controller 140 of system 1010 may determine wind speed and wind direction relative to railroad car 930*a* and 930*b* of train 910 using a curve-correction method. Controller 140 may determine radius 1060 of curve 1050, a bend angle 1070 of curve 1050 between a front end and a back end of train 910, and a length 1080 of train 910. Train length 1080 is measured along centerline 1040 of track 112 from a front end of locomotive 110*a* to a rear end of railroad car 930*b*. Controller 140 may use radius 1060, bend angle 1070, and train length 1080 to calculate a range of wind angles by calculating a relative angle between locomotive 110*a* and the last car of train 910 (i.e., railroad car 930*b*). An interaction between locomotive 110*a* and an electronic map may be utilized to calculate the range of wind angles. The range of wind angles may be overestimated by a predetermined value or percentage since this curve-correction method may only be accurate when entire train 910 is on curve 1050.

Controller 140 may utilize an advanced variation of the curve-correction method described above. The advanced method requires specific geometric track information based on track geometry, a location of locomotive 110*a*, and information associated with train 910. By calculating a specific orientation of each car of train 910, wind speed and wind direction may be determined relative to each car of train 910. Controller 140 may communicate the relative wind speed and direction along with a car type and a car weight for one or more cars of train 910 to a speed restriction system. The speed restriction system may determine advanced predictions of wind-induced tip-over for one or more cars of train 910.

Track information may include geometry of track 112, a location of locomotive 110*a* on track 112, a location of railroad car 930*a* on track 112, and/or a location of railroad care 930*b* on track 112. Controller 140 may obtain track information from a track database. For example, controller 140 may obtain track information from a track database stored on network 890 of communication system 800 of FIG. 8. Controller 140 may determine track information by querying a computer associated with train 910 to collect track information from the track database. Controller 140 may determine track information by storing time-histories of readings from a compass, storing track speed, and integrating headings for each car on train 930. Controller 140 may determine track information by storing time-histories of GPS data to differentiate heading for each car of train 910.

In operation, controller 140 determines a wind direction and a wind speed relative to locomotive 110*a* using wind pressure measurements from probes 130. Locomotive 110*a*, railroad car 930*a*, and railroad car 930*b* are located on curve 1050 of track 112. Controller 140 calculates an absolute wind direction and an absolute wind speed relative to ground using the wind direction and wind speed relative to locomotive 110*a*, a ground speed, and a vehicle direction of locomotive 110*a*. Controller 140 calculates a wind direction and a wind speed relative to railroad car 930*a* and relative to railroad car 930*b* using the absolute wind direction, the absolute wind speed, the ground speed, and a vehicle direction for railroad car 930*b*.

Although FIG. 10 illustrates a particular arrangement of track 112, probes 130, controller 140, and train 910, this disclosure contemplates any suitable arrangement of track 112, probes 130, controller 140, and train 910. Although FIG. 10 illustrates a particular number of locomotives 110, tracks 112, probes 130, controllers 140, trains 910, and railroad cars 930, this disclosure contemplates any suitable number of locomotives 110, tracks 112, probes 130, controllers 140, trains 910, and railroad cars 930. For example, train 910 may include more or less than one locomotive 110*a* and/or more or less than two railroad cars 930*a* and 930*b*. One or more components of system 1010 may be implemented using one or more components of the computer system of FIG. 12.

Modifications, additions, or omissions may be made to system 1010 depicted in FIG. 10. System 1010 may include more, fewer, or other components. For example, train 910 of system 1010 may be replaced with any suitable component used for transportation such as one or more automobiles, buses, trucks, aircrafts, shipping vessels, and the like. As another example, track 112 of system 1010 may be any suitable shape.

FIG. 11 illustrates an example method 1100 for determining wind velocity for multiple vehicles traversing a curve of a track. Method 110 begins at step 1105. At step 1110, a controller (e.g., controller 140 of FIG. 1) determines a first wind direction relative to a first vehicle (e.g., locomotive 110 of FIG. 1). The first vehicle is moving along a curve of a track. At step 1115, the controller determines a first wind speed relative to the first vehicle. The controller may receive one or more wind pressures from one or more probes coupled to the first vehicle and determine the first wind direction and the first wind speed using the one or more received wind pressures. The controller may determine the first wind direction and the first wind speed using method 700 of FIGS. 7A and 7B. Method 1100 then advances to step 1120.

At step 1120, the controller calculates, in real-time, an absolute wind direction relative to ground using the wind direction relative to the first vehicle. At step 1125, the controller calculates, in real-time, an absolute wind speed relative to ground using the wind speed relative to the first vehicle. The controller may calculate the absolute wind direction and absolute wind speed of the first vehicle using a ground speed and a direction of the first vehicle. The controller may calculate absolute wind direction and absolute wind speed of the first vehicle using one or more readings from a compass onboard the first vehicle.

At step 1130, the controller calculates a second wind direction relative to a second vehicle (e.g., railroad car 930*a* or railroad car 930*b* of FIG. 10) using the absolute wind speed and direction calculated in step 1120 along with a ground speed and direction for the second vehicle. The second vehicle is any vehicle attached to the first vehicle that is moving along the curve of the track. At step 1135, the controller calculates a second wind speed relative to the second vehicle using the absolute wind speed calculated in step 1125. The controller may calculate the absolute wind direction and absolute wind speed of the second vehicle using the ground speed and a direction of the second vehicle.

The controller may calculate the second wind speed using an orientation of the second vehicle. The orientation of the second vehicle may be calculated using track information such as track geometry, a location of the first vehicle on the track, and a location of the second vehicle on the track. The controller may calculate the second wind speed using a relative angle between the first vehicle and a last vehicle on the track. The controller may calculate the relative angle using an overall length of the connected vehicles, a bend radius of the track, and a bend angle of the track. Method 1100 then advances to step 1140.

At step 1140, the controller may determine whether the second vehicle has potential for wind-induced tip-over. Controller may determine whether the second vehicle has potential for wind-induced tip-over based on the second wind direction, the second wind speed, vehicle type information for the second vehicle (e.g., a height, width, and/or length of the second vehicle), and/or a weight of the second vehicle.

If the controller determines that the second vehicle does not have potential for wind-induced tip-over, method 1100 advances to step 1150, where method 1100 ends. If the controller determines that the second vehicle has potential for wind-induced tip-over, method 1100 advances to step 1145, where the controller triggers an alarm.

Triggering the alarm may send one or more signals (e.g., a verbal or written message) to an operator of the first vehicle. For example, triggering the alarm may send a message to an operator of a locomotive via a locomotive display (e.g., display 880 of FIG. 8) to decrease the speed of the locomotive. In certain embodiments, triggering the alarm may initiate one or more automated actions (e.g., decreasing the speed of the vehicle and/or activating a siren). Method 1100 then advances from step 1145 to step 1150, where method 1100 ends.

Modifications, additions, or omissions may be made to method 1100 depicted in FIG. 11. For example, method 1100 may include calculating the potential tip-over for multiple railroad cars of a train. Method 1100 may include more, fewer, or other steps. Steps may be performed in parallel or in any suitable order. While discussed as specific components completing the steps of method 1100, any suitable component may perform any step of method 1100. For example, at step 1140, a speed restriction system rather than the controller may determine whether the second vehicle has potential for wind-induced tip-over.

FIG. 12 shows an example computer system that may be used by the systems and methods described herein. For example, one or more components of system 100 of FIG. 1 may include one or more interface(s) 1210, processing circuitry 1220, memory(ies) 1230, and/or other suitable element(s). Interface 1210 (receives input, sends output, processes the input and/or output, and/or performs other suitable operation. Interface 1210 may comprise hardware and/or software.

Processing circuitry 1220 (e.g., processor 850 of FIG. 8) performs or manages the operations of the component. Processing circuitry 1220 may include hardware and/or software. Examples of a processing circuitry include one or more computers, one or more microprocessors, one or more applications, etc. In certain embodiments, processing circuitry 1220 executes logic (e.g., instructions) to perform actions (e.g., operations), such as generating output from input. The logic executed by processing circuitry 1220 may be encoded in one or more tangible, non-transitory computer readable media (such as memory 1230). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 1230 (or memory unit) stores information. Memory 1230 may comprise one or more non-transitory, tangible, computer-readable, and/or computer-executable storage media. Examples of memory 1230 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Although the systems and methods described herein are primarily directed to determining wind direction and/or wind speed relative to a train, the system and methods described herein may be used to determine wind direction and/or wind speed relative to any structure that may be exposed to high winds. For example, the systems and methods described herein may be applied to structures in the HVAC industry, wind turbine farms, sailing vessels, temporary structure for sports facilities, festivals, and/or concerts, and the like.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
    a vehicle operable to traverse a distance;
    one or more probes coupled to the vehicle, wherein the one or more probes are operable to measure wind pressure and generate one or more wind pressure measurements; and
    a controller, wherein the controller is operable to:
        receive the one or more wind pressure measurements from the one or more probes;
        determine a wind angle relative to the vehicle using the one or more wind pressure measurements;
        determine a wind speed relative to the vehicle using the one or more wind pressure measurements and the wind angle; and determine whether the vehicle is susceptible to wind-induced tip-over based at least in part on the wind angle and the wind speed.

2. The system of claim 1, wherein:
the controller is located within the vehicle; and
the controller determines the wind speed when the vehicle is in motion.

3. The system of claim 1, wherein the one or more probes coupled to the vehicle are located in compliance with one or more Association of American Railroads (AAR) clearance plate diagram standards.

4. The system of claim 1, wherein:
the one or more probes comprise a first probe and a second probe;
the first probe is coupled to a top surface of a front portion of the vehicle on a first side of the top surface;
the second probe is coupled to the top surface of the front portion of the vehicle on a second side of the top surface opposite the first side; and
at least one of the first probe and the second probe is coupled to the vehicle outside of aerodynamic separation zones over 360 degrees of relative wind angles of the vehicle.

5. The system of claim 1, wherein each of the one or more probes is coupled to the vehicle by at least one of the following:
one or more magnets;
one or more welds; and
one or more bolts.

6. The system of claim 1, wherein each of the one or more probes is fixed to the vehicle such that each of the one or more probes is restricted from movement independent of the vehicle.

7. The system of claim 1, wherein the vehicle is one of the following:
a locomotive;
a railroad car;
a bus;
a truck;
an aircraft; or
a shipping vessel.

8. A method, comprising:
receiving, by a controller, one or more wind pressure measurements from one or more probes, wherein:
the one or more probes are coupled to a vehicle; and
the vehicle is operable to traverse a distance;
determining, by the controller, a wind angle relative to the vehicle using the one or more wind pressure measurements;
determining, by the controller, a wind speed relative to the vehicle using the one or more wind pressure measurements and the wind angle; and
determine whether the vehicle is susceptible to wind-induced tip-over based at least in part on the wind angle and the wind speed.

9. The method of claim 8, wherein:
the controller is located within the vehicle; and
the controller determines the wind speed when the vehicle is in motion.

10. The method of claim 8, wherein the one or more probes coupled to the vehicle are located in compliance with one or more Association of American Railroads (AAR) clearance plate diagram standards.

11. The method of claim 8, wherein:
the one or more probes comprise a first probe and a second probe;
the first probe is coupled to a top surface of a front portion of the vehicle on a first side of the top surface;
the second probe is coupled to the top surface of the front portion of the vehicle on a second side of the top surface opposite the first side; and
at least one of the first probe and the second probe is coupled to the vehicle outside of aerodynamic separation zones over 360 degrees of relative wind angles of the vehicle.

12. The method of claim 8, wherein each of the one or more probes is coupled to the vehicle by at least one of the following:
one or more magnets;
one or more welds; and
one or more bolts.

13. The method of claim 8, wherein each of the one or more probes is fixed to the vehicle such that each of the one or more probes is restricted from movement independent of the vehicle.

14. The method of claim 8, wherein the vehicle is one of the following:
a locomotive;
a railroad car;
a bus;
a truck;
an aircraft; or
a shipping vessel.

15. One or more computer-readable storage media embodying instructions that, when executed by a processor, cause the processor to perform operations comprising:
receiving one or more wind pressure measurements from one or more probes, wherein:
the one or more probes are coupled to a vehicle; and
the vehicle is operable to traverse a distance;
determining a wind angle relative to the vehicle using the one or more wind pressure measurements;
determining a wind speed relative to the vehicle using the one or more wind pressure measurements and the wind angle; and
determine whether the vehicle is susceptible to wind-induced tip-over based at least in part on the wind angle and the wind speed.

16. The one or more computer-readable storage media of claim 15, wherein:
the controller is located within the vehicle; and
the controller determines the wind speed when the vehicle is in motion.

17. The one or more computer-readable storage media of claim 15, wherein the one or more probes coupled to the vehicle are located in compliance with one or more Association of American Railroads (AAR) clearance plate diagram standards.

18. The one or more computer-readable storage media of claim 15, wherein:
the one or more probes comprise a first probe and a second probe;
the first probe is coupled to a top surface of a front portion of the vehicle on a first side of the top surface;
the second probe is coupled to the top surface of the front portion of the vehicle on a second side of the top surface opposite the first side; and
at least one of the first probe and the second probe is coupled to the vehicle outside of aerodynamic separation zones over 360 degrees of relative wind angles of the vehicle.

19. The one or more computer-readable storage media of claim 15, wherein each of the one or more probes is coupled to the vehicle by at least one of the following:
- one or more magnets;
- one or more welds; and
- one or more bolts.

20. The one or more computer-readable storage media of claim 15, wherein each of the one or more probes is fixed to the vehicle such that each of the one or more probes is restricted from movement independent of the vehicle.

* * * * *